(12) United States Patent
Tsujimura

(10) Patent No.: US 8,254,639 B2
(45) Date of Patent: Aug. 28, 2012

(54) IMAGE STORAGE DEVICE, IMAGING DEVICE, IMAGE STORAGE METHOD, AND PROGRAM

(75) Inventor: Takashi Tsujimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 956 days.

(21) Appl. No.: 11/874,495

(22) Filed: Oct. 18, 2007

(65) Prior Publication Data

US 2008/0273765 A1 Nov. 6, 2008

(30) Foreign Application Priority Data

Oct. 31, 2006 (JP) ................................ 2006-295027

(51) Int. Cl.
*G06K 9/00* (2006.01)
*G06K 9/62* (2006.01)
*G03B 17/00* (2006.01)
(52) U.S. Cl. ..................... 382/107; 382/209; 396/263
(58) Field of Classification Search .............. 382/209, 382/107; 396/263
See application file for complete search history.

(56) References Cited

U.S. PATENT DOCUMENTS

| | | | |
|---|---|---|---|
| 2001/0053292 A1* | 12/2001 | Nakamura | 396/661 |
| 2004/0218916 A1* | 11/2004 | Yamaguchi et al. | 396/263 |
| 2005/0157908 A1* | 7/2005 | Matsugu et al. | 382/107 |
| 2006/0012690 A1* | 1/2006 | Nakamura et al. | 348/231.6 |
| 2006/0092292 A1* | 5/2006 | Matsuoka et al. | 348/231.99 |
| 2006/0147192 A1* | 7/2006 | Zhang et al. | 396/263 |
| 2007/0025722 A1* | 2/2007 | Matsugu et al. | 396/263 |

FOREIGN PATENT DOCUMENTS

| | | | |
|---|---|---|---|
| EP | 844582 A2 * | 5/1998 | |
| JP | 2000-259831 | 9/2000 | |
| JP | 2001-51338 | 2/2001 | |

OTHER PUBLICATIONS

Lien et al., "Automated Facial Expression Recognition Based on FACS Action Units", Published in the Proceedings of FG'98, Apr. 14-16, 1998 in Nara, Japan.*

* cited by examiner

*Primary Examiner* — Anand Bhatnagar
*Assistant Examiner* — Soo Park
(74) *Attorney, Agent, or Firm* — Oblon, Spivak, McClelland, Maier & Neustadt, L.L.P.

(57) ABSTRACT

An image storage device includes a facial-expression-correlation estimator configured to estimate a facial expression correlation representing a degree of correlation between a facial expression in a face image and a predetermined reference facial expression, the face image being included in time-varying image data; a facial-expression estimator configured to detect, through estimation based on transition of the facial expression correlation, a situation where the facial expression in the face image and the predetermined reference facial expression are expected to come to have a predetermined correlative relationship within a predetermined period; and an image-storage controller configured to exercise control so that the image data in the predetermined period from the detection is maintained in an image-data storage unit.

18 Claims, 17 Drawing Sheets

FIG. 7
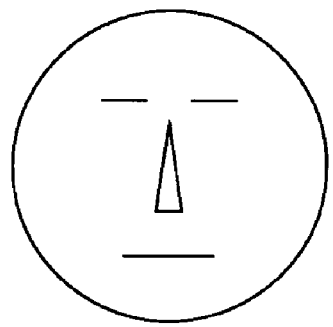
(a)
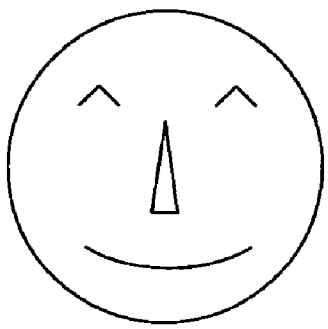
(b)
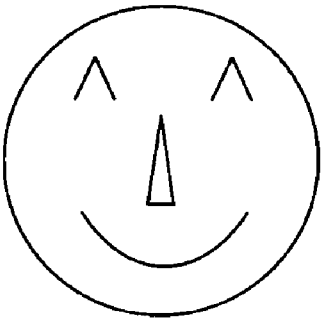
(c)
430

IMAGE STORAGE DEVICE, IMAGING DEVICE, IMAGE STORAGE METHOD, AND PROGRAM

CROSS REFERENCES TO RELATED APPLICATIONS

The present invention contains subject matter related to Japanese Patent Application JP 2006-295027 filed in the Japanese Patent Office on Oct. 31, 2006, the entire contents of which are incorporated herein by reference.

BACKGROUND OF THE INVENTION

1. Field of the Invention

The present invention relates to image storage devices. More specifically, the present invention relates to an image storage device on which an image of an object is recorded, an imaging device for imaging an object, a processing method for the image storage device or the imaging device, and a program for causing a computer to execute the processing method.

2. Description of the Related Art

With the development of face recognition techniques and facial expression recognition techniques, recently, it has become possible to recognize whether an object is a human face and a type of facial expression of the face. Face recognition herein refers to determining whether image data of an object matches face image data including eyes, a nose, a mouth, and so forth. Facial expression recognition refers to analyzing a degree of matching with image data representing a facial expression, such as a laughing face, a crying face, or an angry face. Face recognition and facial expression recognition presuppose processing by a computer, and are also used in imaging devices.

For example, with a camera proposed in Japanese Unexamined Patent Application Publication No. 2001-51338 (FIG. 1), it is possible to recognize a direction of the face of an object and to record image data of the object when the face is looking in a predetermined direction.

SUMMARY OF THE INVENTION

However, according to the related art, image recording is started from a point in time when the image data of the object matches image data of a specific facial expression. Thus, the timing of matching of facial expression differs from the timing of the end of recording. That is, the timing of imaging is delayed, so that the facial expression desired by a user is not recorded. Therefore, it is presumably difficult to record an image of an instantaneous facial expression, such as laughing.

It is desired that it is possible to estimate change in time-varying image data and to record an image intended by a user.

According to an embodiment of the present invention, there is provided an image storage device including facial-expression-correlation estimating means for estimating a facial expression correlation representing a degree of correlation between a facial expression in a face image and a predetermined reference facial expression, the face image being included in time-varying image data; facial-expression estimating means for detecting, through estimation based on transition of the facial expression correlation, a situation where the facial expression in the face image and the predetermined reference facial expression are expected to come to have a predetermined correlative relationship within a predetermined period; and image-storage controlling means for exercising control so that the image data in the predetermined period from the detection is maintained in image-data storage means. Accordingly, in the image storage device, change in facial expression in the predetermined period is estimated on the basis of transition in the facial expression correlation of the face image, and image data in the predetermined period is maintained in the image-data storage means on the basis of the estimation.

In the image storage device, the facial-expression estimating means may detect that the facial expression in the face image and the predetermined reference facial expression are expected to come to have the predetermined correlative relationship when the facial expression correlation exceeds a predetermined degree. In this case, a facial expression is estimated on the basis of the transition of the facial expression correlation with reference to the predetermined degree.

Alternatively, in the image storage device, the facial-expression estimating means may detect that the facial expression in the face image and the predetermined reference facial expression are expected to come to have the predetermined correlative relationship when a gradient of change in the facial expression correlation exceeds a predetermined value and the facial expression correlation exceeds a predetermined degree. In this case, a facial expression is estimated on the basis of the transition of the facial expression correlation with reference to the predetermined degree and the gradient of change.

In the image storage device, the image-storage controlling means may cause the image data in the predetermined period from the detection to be stored in the image-data storage means. Accordingly, image data in the predetermined period is stored in the image-data storage means on the basis of facial expression estimation.

Also, in the image storage device, the image-storage controlling means may cause the image-data storage means to execute updating so that a new piece of the image data is stored, and cause the image-data storage means to stop updating after the elapse of the predetermined period since the detection. In this case, storage of image data is controlled so that, in a process of sequentially storing new pieces of image data and discarding pieces of image data from the earliest one, image data in the image-data storage means is updated and the updating is stopped after the predetermined period.

Also, in the image storage device, the image-storage controlling means may exercise control so that a plurality of pieces of the image data in the predetermined period from the detection are maintained in the image-data storage means. In this case, a plurality of pieces of image data in the predetermined period are maintained in the image-data storage means on the basis of facial expression estimation.

The image storage device may further include moving-picture-data storage means for storing the image data as moving-picture data, and the image-storage controlling means may cause the image data in the predetermined period from the detection to be saved from the moving-picture data storage means to the image data storage means. In this case, while storing image data as moving-picture data, moving-picture data in the predetermined period is saved from the moving-picture-data storage means to the image-data storage means on the basis of facial expression estimation.

According to another embodiment of the present invention, there is provided an image storage device including face-image detecting means for detecting a face image included in time-varying image data; facial-expression-correlation estimating means for estimating a facial expression correlation representing a degree of correlation between a facial expression in the detected face image and a predetermined reference facial expression; facial-expression estimating means for detecting, through estimation based on transition of the facial expression correlation, a situation where the facial expression in the face image and the predetermined reference facial expression are expected to come to have a predetermined correlative relationship within a predetermined period; and image-storage controlling means for exercising control so that the image data in the predetermined period from the detection is maintained in image-data storage means. Accordingly, in the image storage device, change in facial expression in the predetermined period is estimated on the basis of transition in the facial expression correlation of the detected face image, and image data in the predetermined period is maintained in the image-data storage means on the basis of the estimation.

According to another embodiment of the present invention, there is provided an image storage device including face-image detecting means for detecting a plurality of face images included in time-varying image data; face-certainty evaluating means for evaluating face certainties of the plurality of face images detected; facial-expression-correlation estimating means for estimating a facial expression correlation representing a degree of correlation between a predetermined reference facial expression and a facial expression in a face image having a highest face certainty among the face certainties of the plurality of face images; facial-expression estimating means for detecting, through estimation based on transition of the facial expression correlation, a situation where the predetermined reference facial expression and the facial expression in the face image having the highest face certainty are expected to come to have a predetermined correlative relationship within a predetermined period; and image-storage controlling means for exercising control so that the image data in the predetermined period from the detection is maintained in image-data storage means. Accordingly, in the image storage device, change in facial expression in the predetermined period is estimated on the basis of transition in the facial expression correlation of the face image having the highest face certainty, and image data in the predetermined period is maintained in the image-data storage means on the basis of the estimation.

According to another embodiment of the present invention, there is provided an image storage device including face-image detecting means for detecting a plurality of face images included in time-varying image data; selection accepting means for accepting selection of a face image that is to be used for estimation among the plurality of face images detected; facial-expression-correlation estimating means for estimating a facial expression correlation representing a degree of correlation between a facial expression in the selected face image and a predetermined reference facial expression; facial-expression estimating means for detecting, through estimation based on transition of the facial expression correlation, a situation where the facial expression in the selected face image and the predetermined reference facial expression are expected to come to have a predetermined correlative relationship within a predetermined period; and image-storage controlling means for exercising control so that the image data in the predetermined period from the detection is maintained in image-data storage means. Accordingly, in the image storage device, change in facial expression in the predetermined period is estimated on the basis of transition in the facial expression correlation of the selected face image, and image data in the predetermined period is maintained in the image-data storage means on the basis of the estimation.

According to another embodiment of the present invention, there is provided an imaging device including imaging means for imaging a time-varying object and outputting corresponding image data; facial-expression-correlation estimating means for estimating a facial expression correlation representing a degree of correlation between a facial expression in a face image included in the image data and a predetermined reference facial expression; facial-expression estimating means for detecting, through estimation based on transition of the facial expression correlation, a situation where the facial expression in the face image and the predetermined reference facial expression are expected to come to have a predetermined correlative relationship within a predetermined period; and image-storage controlling means for exercising control so that the image data in the predetermined period from the detection is maintained in image-data storage means. Accordingly, in the image storage device, change in facial expression in the predetermined period is estimated on the basis of transition in the facial expression correlation of the captured face image, and image data in the predetermined period is maintained in the image-data storage means on the basis of the estimation.

According to these embodiments of the present invention, advantageously, it is possible to estimate change in time-varying image data and to record an image intended by a user.

BRIEF DESCRIPTION OF THE DRAWINGS

FIG. 7 is a diagram showing an example of transition of facial expression correlation in this embodiment;

DESCRIPTION OF THE PREFERRED EMBODIMENTS

Next, embodiments of the present invention will be described in detail with reference to the drawings.

Figure 1:
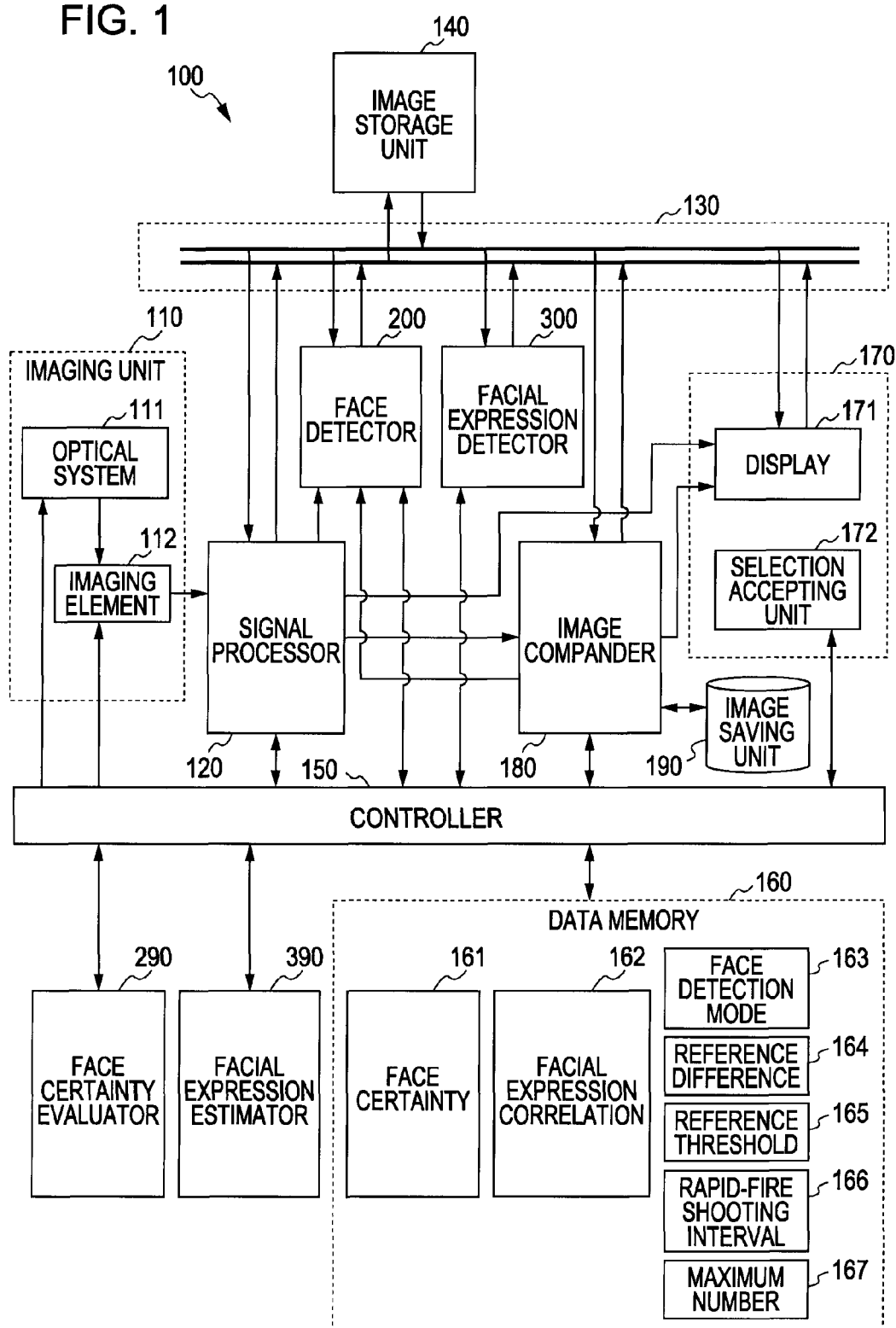
FIG. 1 is a diagram showing an example of the functional configuration of an imaging device according to an embodiment of the present invention.

FIG. 1 is a diagram showing an example functional configuration of an imaging device 100 according to an embodiment of the present invention. The imaging device 100 includes an imaging unit 110, a signal processor 120, a bus 130, an image storage unit 140, a controller 150, a data memory 160, a user interface 170, an image compander 180, an image saving unit 190, a face detector 200, a face certainty evaluator 290, a facial expression detector 300, and a facial expression estimator 390.

The imaging unit 110 captures an image of an object and outputs corresponding image data. The imaging unit 110 includes an optical system 111 and an imaging element 112. The optical system 111 includes a set of lenses such as a focus lens and a zoom lens so that light reflected by an object passes through the set of lenses. The incident light having passes through the set of lenses reaches the imaging element 112. The incident light forms an image on the imaging element 112, and the imaging element 112 converts the image into electric signals. The electric signals are output to the signal processor 120.

The signal processor 120 executes various types of signal processing on the electric signals output from the imaging element 112, and supplies resulting image data to components of the imaging device 100. The signal processing executed in the signal processor 120 includes, for example, noise reduction, level correction, analog-to-digital (A/D) conversion, and color correction. More specifically, the image data is supplied to the image storage unit 140, the face detector 200, the user interface 170, and the image compander 180. The processing executed in the signal processor 120 is controlled according to control signals supplied from the controller 150.

The bus 130 is a shared transmission path for transmission of image data. The bus 130 connects the signal processor 120, the image storage unit 140, the image compander 180, the face detector 200, and the facial expression detector 300 with each other.

The image storage unit 140 stores image data that is processed by the imaging device 100. The image data stored in the image storage unit 140 can be accessed via the bus 130 from the signal processor 120, the image compander 180, the face detector 200, the facial expression detector 300, and the user interface 170.

The image compander 180 compresses image data supplied from components of the imaging device 100 and supplies the compressed image data to the image saving unit 190, and expands image data supplied from the image saving unit 190 and supplies the expanded image data to components of the imaging device 100. The compression by the image compander 180 may be, for example, JPEG (Joint Photographic Experts Group) compression.

The image saving unit 190 saves the compressed image data supplied from the image compander 180. The compressed image data saved in the image saving unit 190 can be expanded by the image compander 180.

The face detector 200 detects a face image from image data. The face detector 200 receives image data from which a face image is to be detected from the signal processor 120, the image storage unit 140, or the image compander 180. In detecting a face image, the face detector 200 estimates face certainties from a comprehensive perspective on the basis of a combination of evaluative elements of face images included in the image data (e.g., a size, coordinate values, a degree of matching, a degree of frontality, and a degree of uprightness). The evaluative elements are weighted by coefficients supplied from the controller 150. The face certainties estimated by the face detector 200 are supplied to the controller 150.

The face certainty evaluator 290 evaluates the face certainty calculated by the face detector 200. Through the evaluation of face certainty, it is determined, for example, which face image has a highest face certainty. The face certainty evaluator 290 receives face certainties that are to be evaluated from the controller 150, and supplies a result of face certainty evaluation to the controller 150.

The user interface 170 serves as an interface for a user of the imaging device 100. The user interface 170 includes a display 171 and a selection accepting unit 172.

The display 171 displays an image corresponding to image data supplied from the signal processor 120 or the image compander 180. Furthermore, in accordance with the result of evaluation by the face certainty evaluator 290, the display 171 displays a frame indicating the position of a face image, as superposed on the face image. For example, when a plurality of face images exist, the display 171 displays a frame for a face image with a highest face certainty so that the frame is visually highlighted, while displaying other frames normally.

The selection accepting unit 172 accepts input of an instruction indicating user's selection of a face image from face images displayed on the display 171. For example, when a plurality of images are displayed on the display 171, the user can select any one of the face images by moving the superposed frame. The result of selection is supplied to the controller 150.

The facial expression detector 300 detects a facial expression on the basis of image data (image data in which a face image has been detected) supplied from the image storage unit 140. A type of facial expression that is to be detected is specified by facial-expression-type specification information supplied from the controller 150. The following description deals with an example where "Laughing" is specified as the facial-expression-type specification information. The facial expression detector 300 compares the face image with reference data (reference facial expression) of "Laughing" to estimate a facial expression correlation indicating a degree of correlation with the reference facial expression. That is, the facial expression correlation increases as the face image becomes more resemblant to the reference facial expression. The facial expression correlation estimated by the facial expression detector 300 is supplied to the controller 150.

The facial expression estimator 390 estimates temporal change in facial expression on the basis of facial expression correlations estimated by the facial expression detector 300. On the basis of transition of facial expression correlation, the facial expression estimator 390 estimates whether the facial expression of the face image in the image data and the reference facial expression come to have a certain degree of correlation within a predetermined period. For example, the facial expression estimator 390 compares the facial expression correlation with a reference facial expression threshold, and determines that the facial expression of the face image in the image data becomes close to the reference facial expression within the predetermined period if the facial expression correlation exceeds the reference facial expression threshold.

Alternatively, the facial expression estimator 390 may determine that the facial expression of the face image in the image data becomes close to the reference facial expression within the predetermined period if the difference between facial expression correlations before and after the temporal change exceeds a reference facial expression difference and the facial expression correlation exceeds the reference facial expression threshold.

The facial expression estimator 390 receives the facial expression correlations, the reference facial expression threshold, and the reference facial expression difference used for facial expression estimation from the controller 150, and supplies the result of facial expression estimation described above to the controller 150.

The controller 150 controls processing executed by the imaging unit 110, the signal processor 120, the image compander 180, the face detector 200, the facial expression detector 300, the face certainty evaluator 290, and the facial expression estimator 390 in the imaging device 100. For the purpose of this control, a focus value and an aperture value, a data output destination, a compression/expansion ratio, weight coefficients for calculating a face certainty (face detection parameters), facial-expression-type specification information (facial expression detection parameter), image data to be evaluated, and a face image to be estimated are used as parameters or data to be processed in the imaging unit 110, the signal processor 120, the image compander 180, the face detector 200, the facial expression detector 300, the face certainty evaluator 290, and the facial expression estimator 390 in the imaging device 100, respectively. Thus, the controller 150 supplies these parameters to the above components.

First, the controller 150 controls imaging by the imaging unit 110. More specifically, the controller 150 controls the aperture and focus of the optical system 111. Furthermore, the controller 150 controls signal processing executed by the signal processor 120 and instructs an output destination of image signals.

Furthermore, the controller 150 controls detection by the face detector 200 and detection by the facial expression detector 300. For the purpose of these detections, weight coefficients for calculating a face certainty and facial-expression-type specification information are used as detection parameters. Thus, the controller 150 supplies weight coefficients for calculating a face certainty to the face detector 200 and supplies facial-expression-type specification information to the facial expression detector 300. Furthermore, the controller 150 instructs start and end of detection to the face detector 200 and the facial expression detector 300. The controller 150 receives data representing detection results from the face detector 200 and the facial expression detector 300. Of the detection result data, the controller 150 supplies the face detection result data (face certainty) from the face detector 200 to the face certainty evaluator 290, and supplies the facial expression detection result data (facial expression correlation) from the facial expression detector 300 to the facial expression estimator 390.

Furthermore, the controller 150 controls compression and expansion of image data saved in the image saving unit 190, executed by the image compander 180.

The data memory 160 holds various types of data used in the imaging device 100. The data held in the data memory 160 can be broadly classified into detection result data and setting parameters. The detection result data includes a face certainty 161 and a facial expression correlation 162. The setting parameters include a face detection mode 163, a reference difference 164, a reference threshold 165, a rapid-fire shooting interval 166, and a maximum number 167.

The face certainty 161 is an area for holding face certainties of face images included in image data. The values of the face certainties are calculated by the face detector 200.

The facial expression correlation 162 is an area for holding facial expression correlations associated with individual face images included in image data. The values of the facial expression correlations are obtained by estimating degrees of correlation with the reference facial expression by the facial expression detector 300.

The face detection mode 163 is an area for holding a face detection mode flag indicating whether face detection is to be executed. When the face detection mode flag indicates that face detection is to be executed, a face image is detected from image data.

The reference difference 164 is an area for holding a difference that serves as a reference, set by the user. The reference difference is compared with a difference between facial expression correlations before and after a temporal change in facial expression correlation. The reference difference is referred to in processing executed by the facial expression estimator 390.

The reference threshold 165 is an area for holding a threshold that serves as a difference, set by the user. The threshold is compared with a facial expression correlation, and is used in processing executed by the facial expression estimator 390 to detect whether correlation with reference data is high.

The rapid-fire shooting interval 166 is an area for holding setting of a time interval between a timing of shooting and a next timing of shooting in a rapid-fire shooting mode.

The maximum number 167 is an area for holding a value set by the user as a maximum number of pictures taken in the rapid-fire shooting mode.

Figure 2:
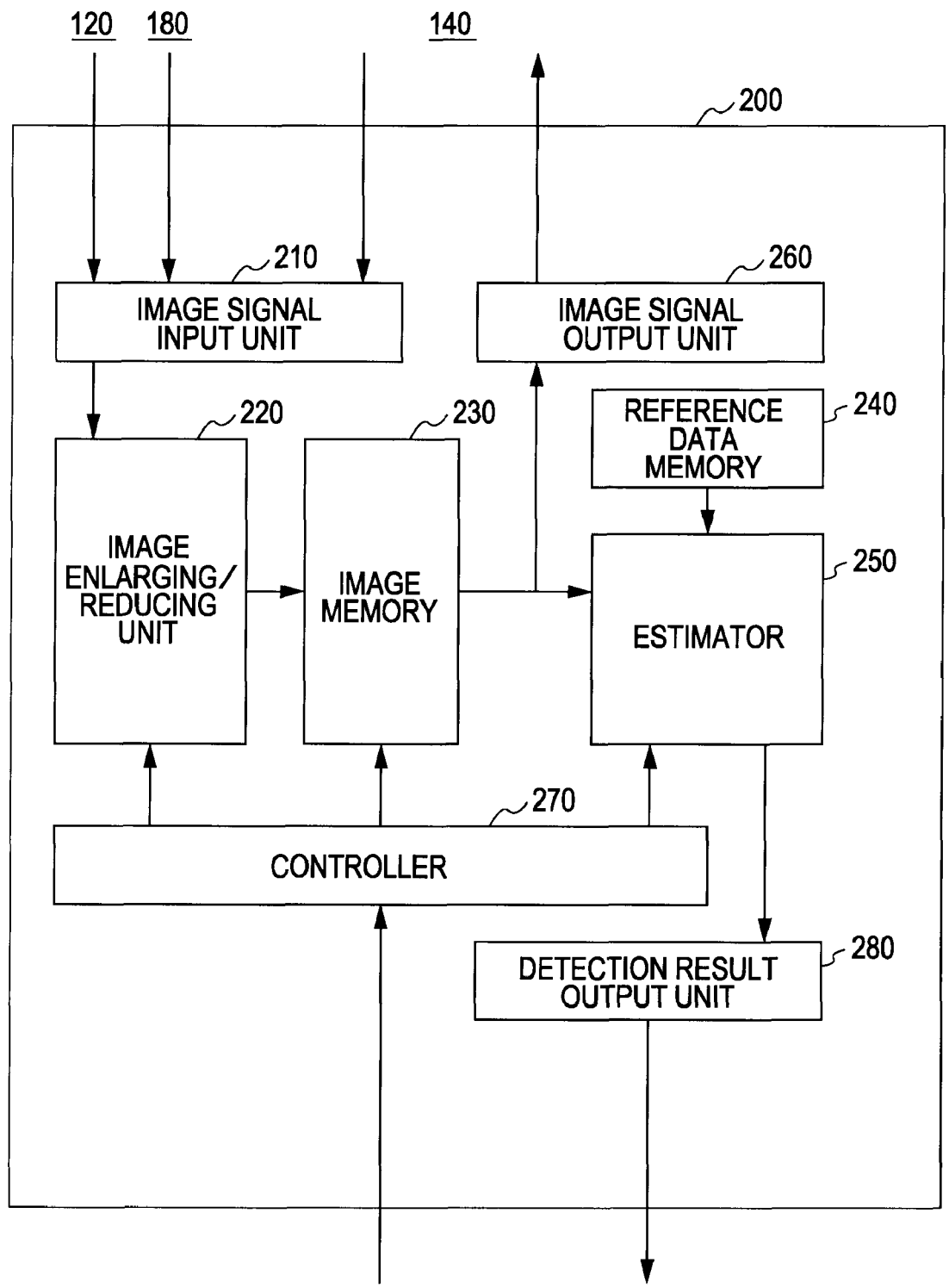
FIG. 2 is a diagram showing an example of the functional configuration of a face detector in the embodiment.

FIG. 2 is a diagram showing an example functional configuration of the face detector 200 in this embodiment. The face detector 200 includes an image signal input unit 210, an image enlarging/reducing unit 220, an image memory 230, a reference data memory 240, an estimator 250, an image signal output unit 260, a controller 270, and a detection result output unit 280.

The image signal input unit 210 receives image data supplied (input) from components of the imaging device 100, and supplies the image data to the image enlarging/reducing unit 220. More specifically, the image signal input unit 210 receives image data from the signal processor 120, the image compander 180, and the image storage unit 140.

The image enlarging/reducing unit 220 enlarges or reduces an image corresponding to the image data supplied from the image signal input unit 210. The image enlarging/reducing unit 220 executes enlarging or reduction so that face images of various sizes included in the image data are enlarged or reduced to a predetermined size. The image enlarging/reducing unit 220 receives a value of enlarging ratio or reducing ratio used for enlarging or reduction from the controller 270. The image data that has undergone enlarging or reduction by the image enlarging/reducing unit 220 is supplied to the image memory 230.

The image memory 230 temporarily holds the image data supplied from the image enlarging/reducing unit 220. The image memory 230 receives an address in the image memory 230 at which the image data is to be held from the controller 270. The image data held in the image memory 230 is supplied to the estimator 250 and the image signal output unit 260.

The reference data memory 240 holds face reference data in advance, and supplies the face reference data to the estimator 250. The face reference data is used for estimation of a face certainty by the estimator 250. The face size of the face reference data is fixed, so that image data corresponding to the face size of the face reference data is extracted from the image data to be compared with the face reference data when estimating a face certainty.

The estimator 250 estimates a face certainty on the basis of the image data supplied from the image memory 230. For the purpose of the estimation of a face certainty, face reference data and weight coefficients for calculating a face certainty are used. Thus, the estimator 250 receives the face reference data and the weight coefficients from the reference data memory 240 and the controller 270, respectively. The estimator 250 extracts image data of a predetermined size from the image data supplied thereto so that the face size of the image data coincides with the face size of the face reference data.

Now, estimation of a face certainty will be described. A face certainty is estimated from a comprehensive perspective using a combination of evaluative elements. The evaluative elements include, for example, a size, coordinate values, a degree of matching, a degree of frontality, and a degree of uprightness. The size element represents the size of the area of a face in the entire area of the image data. The face certainty relatively increases as the size relatively increases. The coordinate values element represents the coordinate values of the face in the entire area of the image data. The face certainty relatively increases as the position represented by the coordinate values becomes closer to the center. The degree of matching element represents a face likelihood determined with reference to the face reference data. The face certainty relatively increases as the degree of matching relatively increases. The degree of frontality element represents a degree of frontality of the face, determined with reference to the face reference data. The degree of frontality relatively increases as the direction in which the face is looking becomes closer to the front, and the face certainty relatively increases accordingly. The degree of uprightness element represents a degree of uprightness of the face, determined with reference to the face reference data. The degree of uprightness relatively increases as the tilt becomes closer to zero, and the face certainty relatively increases accordingly. By multiplying these elements with weight coefficients and adding up the products, face detection can be executed as intended:

$$\begin{aligned}\text{Face certainty} =\ &(\text{Area weight}) \times (\text{Value of face area size}) +\\ &(\text{Coordinate weight}) \times (\text{Coordinate values of face area}) +\\ &(\text{Matching weight}) \times (\text{Value of matching degree}) +\\ &(\text{Frontality weight}) \times (\text{Value of frontality}) +\\ &(\text{Uprightness weight}) \times (\text{Value of uprightness})\end{aligned}$$

The weight coefficients for the individual evaluative elements are supplied from the controller 270. The face certainty calculated by the estimator 250 is supplied to the detection result output unit 280.

The image signal output unit 260 receives the image data supplied from the image memory 230 and supplies (outputs) the image data to the image storage unit 140. Similarly to the estimator 250, the image signal output unit 260 extracts image data of a predetermined size when supplying the image data.

The controller 270 controls processing executed by the image enlarging/reducing unit 220, the image memory 230, and the estimator 250 in the face detector 200. For the purpose of this control, an enlarging/reducing ratio, a memory address, and weight coefficients for calculating a face certainty are used in the image enlarging/reducing unit 220, the image memory 230, and the estimator 250, respectively. Thus, the controller 270 supplies these parameters to the above components. The controller 270 receives the weight coefficients for calculating a face certainty from the controller 150 of the imaging device 100.

The detection result output unit 280 receives the face certainty supplied from the estimator 250 and supplies (outputs) the face certainty to the controller 150 of the imaging device 100. The face certainty is held in the face certainty 161.

Figure 3:
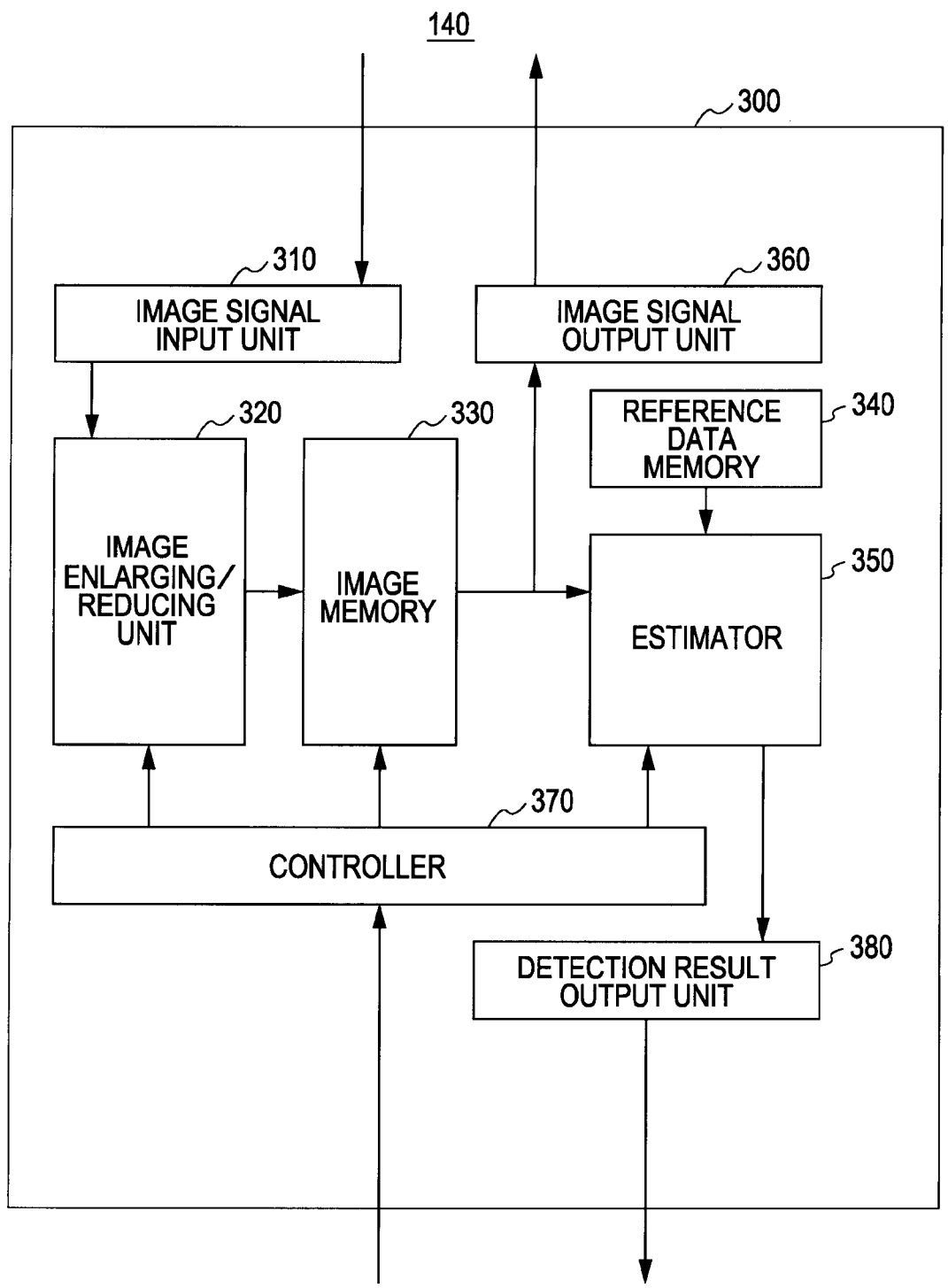
FIG. 3 is a diagram showing an example of the functional configuration of a facial expression detector in the embodiment.

FIG. 3 is a diagram showing an example functional configuration of the facial expression detector 300 in this embodiment. The facial expression detector 300 includes an image signal input unit 310, an image enlarging/reducing unit 320, an image memory 330, a reference data memory 340, an estimator 350, an image signal output unit 360, a controller 370, and a detection result output unit 380.

The image signal input unit 310 receives image data supplied (input) from components of the imaging device 100 and supplies the image data to the image enlarging/reducing unit 320. More specifically, the image signal input unit 310 receives image data from the signal processor 120, the image compander 180, and the image storage unit 140.

The image enlarging/reducing unit 320 enlarges or reduces an image corresponding to the image data supplied from the image signal input unit 310. The image enlarging/reducing unit 320 executes enlarging or reduction so that face images of various sizes included in the image data are enlarged or reduced to a predetermined size. The image enlarging/reducing unit 320 receives a value of enlarging ratio or reducing ratio used for enlarging or reduction from the controller 370. The image data that has undergone enlarging or reduction by the image enlarging/reducing unit 320 is supplied to the image memory 330.

The image memory 330 temporarily holds the image data supplied from the image enlarging/reducing unit 320. The image memory 330 receives an address in the image memory 330 at which the image data is to be held from the controller 370. The image data held in the image memory 330 is supplied to the estimator 350 and the image signal output unit 360.

The reference data memory 340 holds facial expression reference data (reference facial expression) in advance, and supplies the facial expression reference data to the estimator 350. The reference facial expression data is used for estimation of a facial expression correlation by the estimator 350. The reference facial expression data is provided for each facial expression type. The face size of the facial expression reference data is fixed, so that image data corresponding to the face size of the facial expression reference data is extracted from the image data to be compared with the facial expression reference data when estimating a facial expression correlation.

The estimator 350 estimates a facial expression correlation on the basis of the image data supplied from the image memory 330. For the purpose of the estimation of a facial expression correlation, the facial expression reference data and facial-expression-type specification information are used. Thus, the estimator 350 receives these parameters from the reference data memory 340 and the controller 370, respectively. The estimator 350 extracts image data of a predetermined size from the image data supplied thereto so that the face size of the image data coincides with the face size of the facial expression reference data.

Now, the estimation of a facial expression correlation will be described. In the estimation of a facial expression correlation, in accordance with a facial expression type (e.g., "Laughing") specified by the facial-expression-type specifying information, a face image in the image data is compared with facial expression reference data (e.g., "Laughing" reference data) to estimate a degree of correlation with the reference facial expression as a facial expression correlation. That is, the facial expression correlation increases as the face image becomes more resemblant to the facial expression reference data. The facial-expression-type specification information used for estimation of the facial expression correlation is supplied from the controller 370. The facial expression correlation estimated by the estimator 350 is supplied to the detection result output unit 380.

The image signal output unit 360 receives the image data supplied from the image memory 330 and supplies (outputs) the image data to the image storage unit 140. Similarly to the estimator 350, the image signal output unit 360 extracts image data of a predetermined size when supplying the image data.

The controller 370 controls processing executed by the image enlarging/reducing unit 320, the image memory 330, and the estimator 350 of the facial expression detector 300. For the purpose of this control, an enlarging/reducing ratio, a memory address, and a facial-expression-type specification information are used in the image enlarging/reducing unit 320, the image memory 330, and the estimator 350, respectively. Thus, the controller 370 supplies these parameters to the above components. The controller 370 receives the facial-expression-type specification information from the controller 150 of the imaging device 100.

The detection result output unit 380 receives the facial expression correlation supplied from the estimator 350 and supplies (outputs) the facial expression correlation to the controller 150 of the imaging device 100. The facial expression correlation is held in the facial expression correlation 162.

Figure 4:
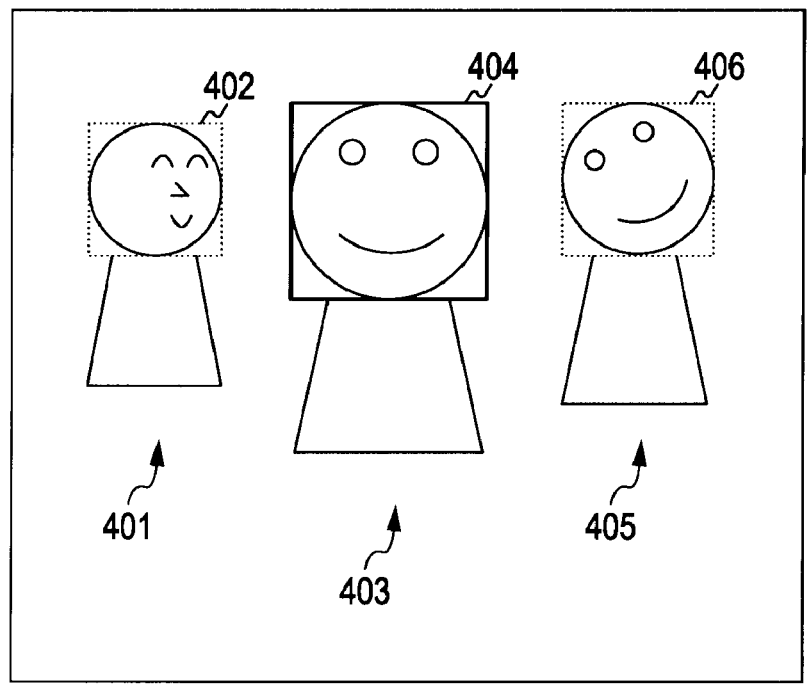
FIG. 4 is a diagram showing an example of a screen that is displayed in this embodiment.

FIG. 4 is a diagram showing an example of a screen that is displayed in this embodiment. The screen is provided to the user by the display 171 in the user interface 170 of the imaging device 100. Referring to FIG. 4, frames are superposed on face images of three persons according to a result of evaluation by the face certainty evaluator 290. More specifically, a frame of a face image with a highest evaluation of face certainty is visually highlighted while the other frames are displayed normally. The face certainty is estimated from a comprehensive perspective on the basis of a combination of evaluative elements (e.g., size, coordinate values, degree of matching, degree of frontality, and degree of uprightness), so that the face certainty can be affected by weights of the individual elements. However, it is possible to change which frame to be highlighted according to user's selection via the selection accepting unit 172. The screen includes a left-side person 401, a normal frame 402, a center person 403, a highlighted frame 404, a right-side person 405, and a normal frame 406.

The left-side person 401 is located in a left part of the display area, and the face thereof is looking in a lateral direction. The normal frame 402 is superposed on the face image of the left-side person 401. The normal frame 402 indicates that the face image of the left-side person 401 is not a face image with a highest evaluation of face certainty among the three persons.

The center person 403 is located in a central part of the display area, and the face thereof is looking in a front direction. The highlighted frame 404 is superposed on the face image of the center person 403. The highlighted frame 404 indicates that the face image of the center person 403 is a face image with a highest evaluation of face certainty among the three persons.

The right-side person 405 is located in a right part of the display area, and the face thereof is tilted. The normal frame 406 is superposed on the face image of the right-side person 405. The normal frame 406 indicates that the face image of the right-side person 405 is not a face image with a highest evaluation of face certainty among the three persons.

Figure 5:
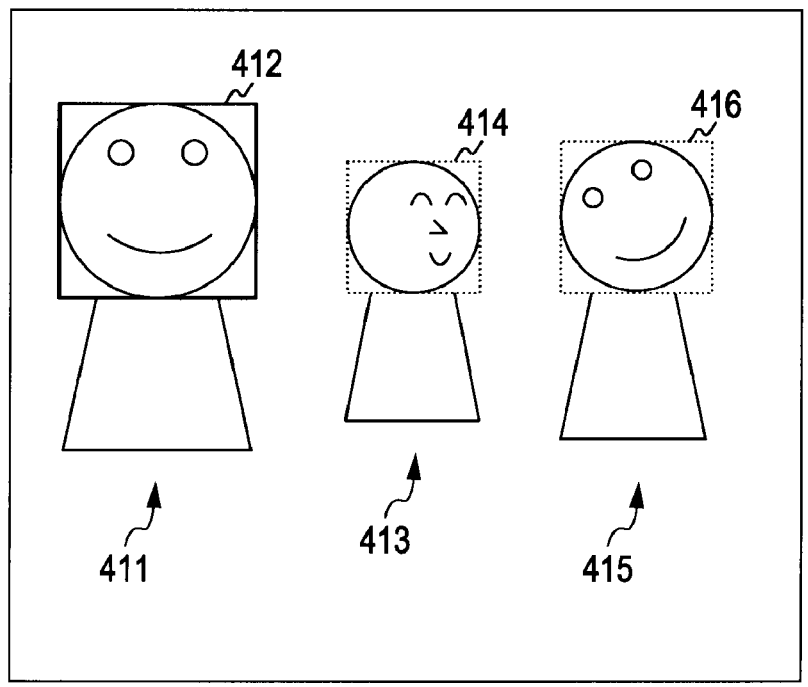
FIG. 5 is a diagram showing another example of a screen that is displayed in this embodiment.

FIG. 5 is a diagram showing another example of a screen that is displayed in this embodiment. The screen is provided to the user by the display 171 in the user interface 170 of the imaging device 100. Referring to FIG. 5, similarly to the screen shown in FIG. 4, frames are superposed on face images of three persons according to a result of evaluation by the face certainty evaluator 290. More specifically, a frame of a face image with a highest evaluation of face certainty is visually highlighted while the other frames are displayed normally. However, the highlighted frame can be moved to the positions of the normal frames according to user's selection via the selection accepting unit 172. The screen includes a left-side person 411, a highlighted frame 412, a center person 413, a normal frame 414, a right-side person 415, and a normal frame 416.

In FIG. 5, the effect of weighting of elements is exhibited. More specifically, in estimation of a face certainty, although the face certainty relatively increases as the position represented by the coordinate values of the face image becomes closer to the center, the face certainties of the other face images can be increased by setting a small value as a weight coefficient for the coordinate values.

The left-side person 411 is located in a left part of the display area, and the face thereof is looking in a front direction. The highlighted frame 412 is superposed on the face image of the left-side person 411. The highlighted frame 412 indicates that the face image of the left-side person 411 is a face image with a highest evaluation of face certainty among the three persons.

The center person 413 is located in a central part of the display area, and the face thereof is looking in a lateral direction. The normal frame 412 is superposed on the face image of the center person 413. The normal frame 414 indicates that the face image of the center person 413 is not a face image with a highest evaluation of face certainty among the three persons.

The right-side person 415 is located in a right part of the display area, and the face thereof is tilted. The normal frame 416 is superposed on the face image of the right-side person 415. The normal frame 416 indicates that the face image of the right-side person 415 is not a face image with a highest evaluation of face certainty among the three persons.

Figure 6:
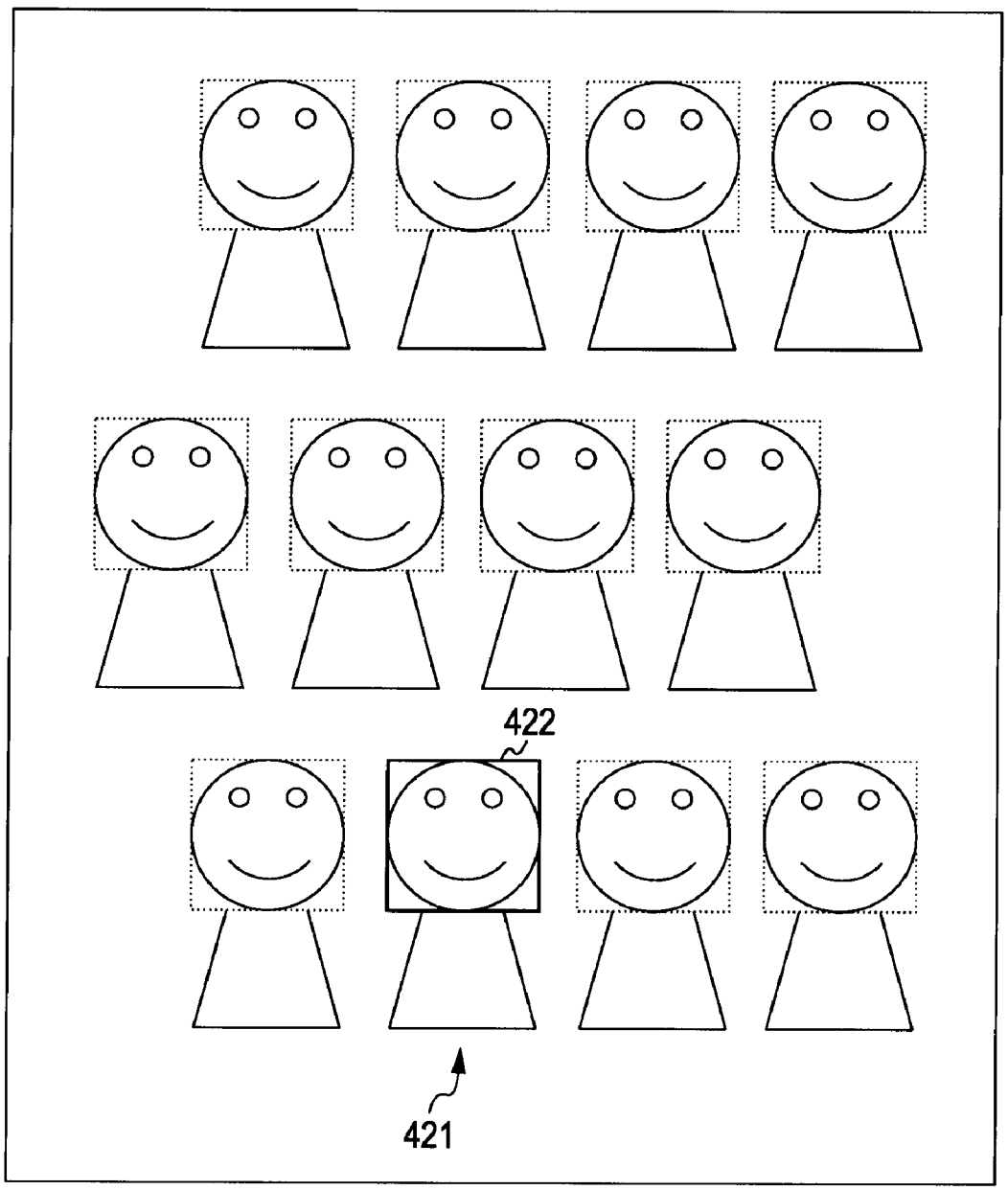
FIG. 6 is a diagram showing yet another example of a screen that is displayed in this embodiment.

FIG. 6 is a diagram showing yet another example of a screen that is displayed in this embodiment. The screen is provided to the user by the display 171 in the user interface 170 of the imaging device 100. Referring to FIG. 6, similarly to the screens shown in FIGS. 4 and 5, frames are superposed on face images of a large number of persons according to a result of evaluation by the face certainty evaluator 290. More specifically, a frame of a face image with a highest evaluation of face certainty is visually highlighted while the other frames are displayed normally. However, the highlighted frame can be moved to the positions of the normal frames according to user's selection via the selection accepting unit 172. The screen includes a specific person 421 and a highlighted frame 422.

In FIG. 6, the effect of movement of the highlighted frame is exhibited. More specifically, although the face certainty relatively increases as the position represented by the coordinate values of the face image becomes closer to the center (neglecting the effects of the other elements and assuming that the weight coefficients for the individual elements are equal), the following description "the face image of the specific person 421 has a highest evaluation of face certainty among the persons in the display area" indicates that the highlighted frame 422 that had been superposed on the face image of the person at the center has been moved to the face image of the specific person 421 according to user's selection.

The specific person 421 is located in a lower part of the display area. The highlighted frame 422 is superposed on the specific person 421. The highlighted frame 422 indicates that the face image of the specific person 421 has a highest evaluation of face certainty among the persons in the display area.

FIG. 7 is a diagram showing an example of facial expression correlation transition 430 in this embodiment. The facial expression correlation transition 430 three phases of change in facial expression and facial expression correlation in a case where the facial-expression-type specification information specifies "Laughing". The facial expression correlation transition includes (a) serious face, (b) smiling face, and (c) laughing face.

The serious face (a) represents a face whose facial expression is to be determined. Data of the serious face (a) considerably differs from the facial expression reference data of "Laughing", so that the facial expression correlation is low.

The smiling face (b) represents a face whose facial expression is to be determined. Data of the smiling face (b) is closer to the facial expression reference data of "Laughing", so that the facial expression correlation is high.

The laughing face (c) represents a face whose facial expression is to be determined. Data of the laughing face (c) matches the facial expression reference data of "Laughing", so that the facial expression correlation exhibits a maximum value.

Figure 8:
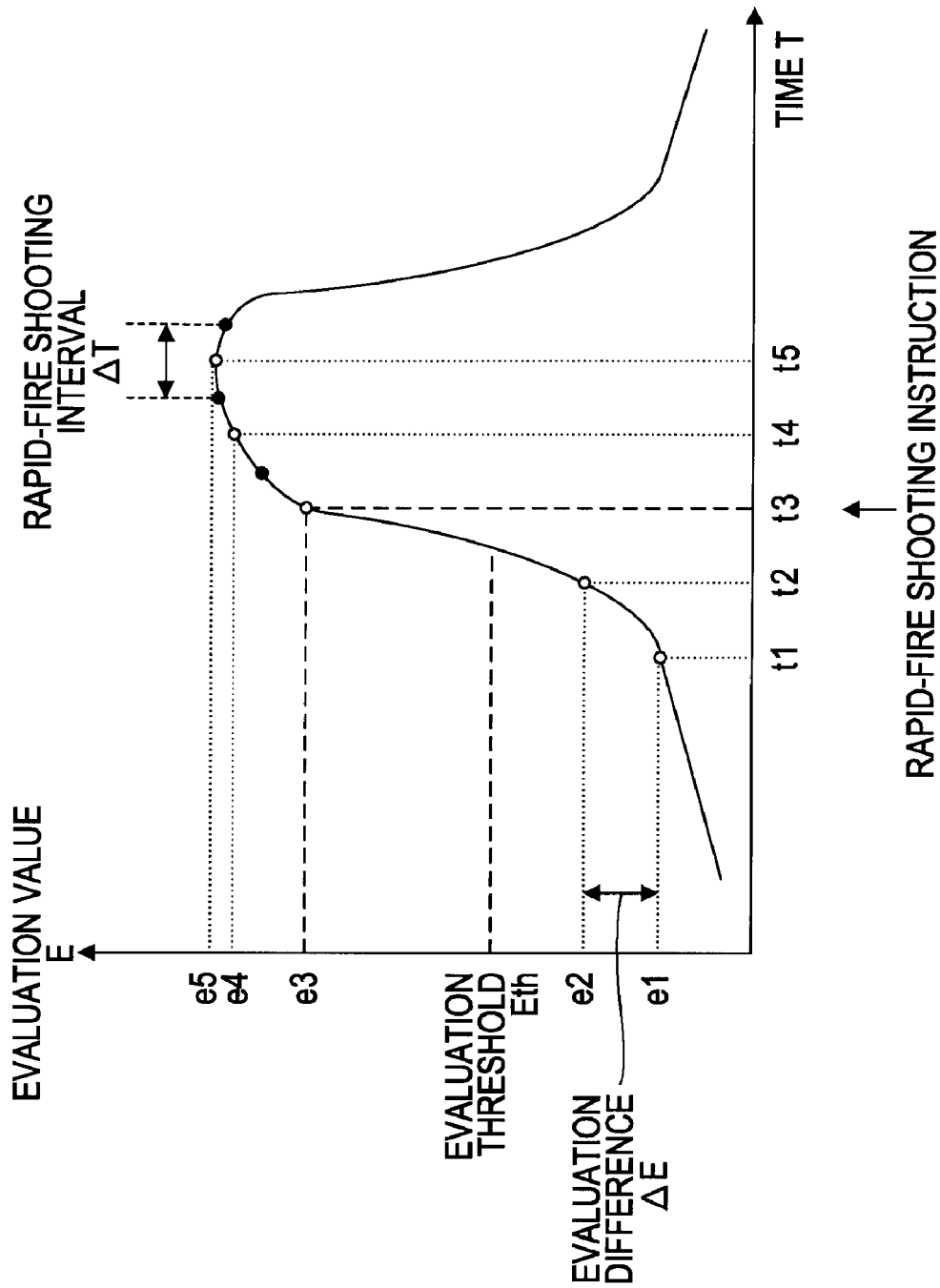
FIG. 8 is a graph showing an example of a curve representing temporal change in facial expression correlation in this embodiment.

FIG. 8 is a graph showing an example of a curve representing temporal change in facial expression correlation in this embodiment. In this example of temporal change in facial expression correlation, a timing of rapid-fire shooting instruction and a time interval of rapid-fire shooting are shown. The horizontal axis represents time T, where time intervals defined by t1 to t5 are constant. The vertical axis represents facial expression correlation, denoted as evaluation value E. Furthermore, on the vertical axis, an evaluation threshold $E_{th}$ and an evaluation difference $\Delta E$ are shown. The evaluation threshold $E_{th}$ is used as a reference value in estimating a facial expression. Evaluation values e1, e4, and e5 correspond to the serious face (a), the smiling face (b), and the laughing face (c) in FIG. 7.

Now, a flow from estimation of a facial expression to storage of images will be described on the basis of this curve. The evaluation values e1 to e5 at times t1 to t5, individually indicated by white dots, are used as data for estimating a facial expression. The evaluation value e1 at time t1 changes to the evaluation value e2 at time t2 and then to the evaluation value e3 at time t3. During this change, the evaluation value exceeding the evaluation threshold $E_{th}$ is detected, and upon the detection as a trigger, an instruction for rapid-fire shooting is issued at time t3. The instruction for rapid-fire shooting instructs successive storage of images. According to the instruction for rapid-fire shooting, images representing facial expressions around time t4 and time t5 are stored. The timings at which the images are stored are indicated by black dots. In this example, the setting of the maximum number of images that can be stored is three. The images are stored in the image storage unit 140 of the imaging device 100.

Alternatively, an instruction for rapid-fire shooting may be triggered by detection of a situation where the difference between the evaluation value e1 at time t1 and the evaluation value e2 at time 2 exceeds the evaluation difference $\Delta E$ and the evaluation value e3 at time t3 exceeds the evaluation threshold $E_{th}$. In this case, the evaluation threshold $E_{th}$ may be chosen to be a relatively small value.

Figure 9:
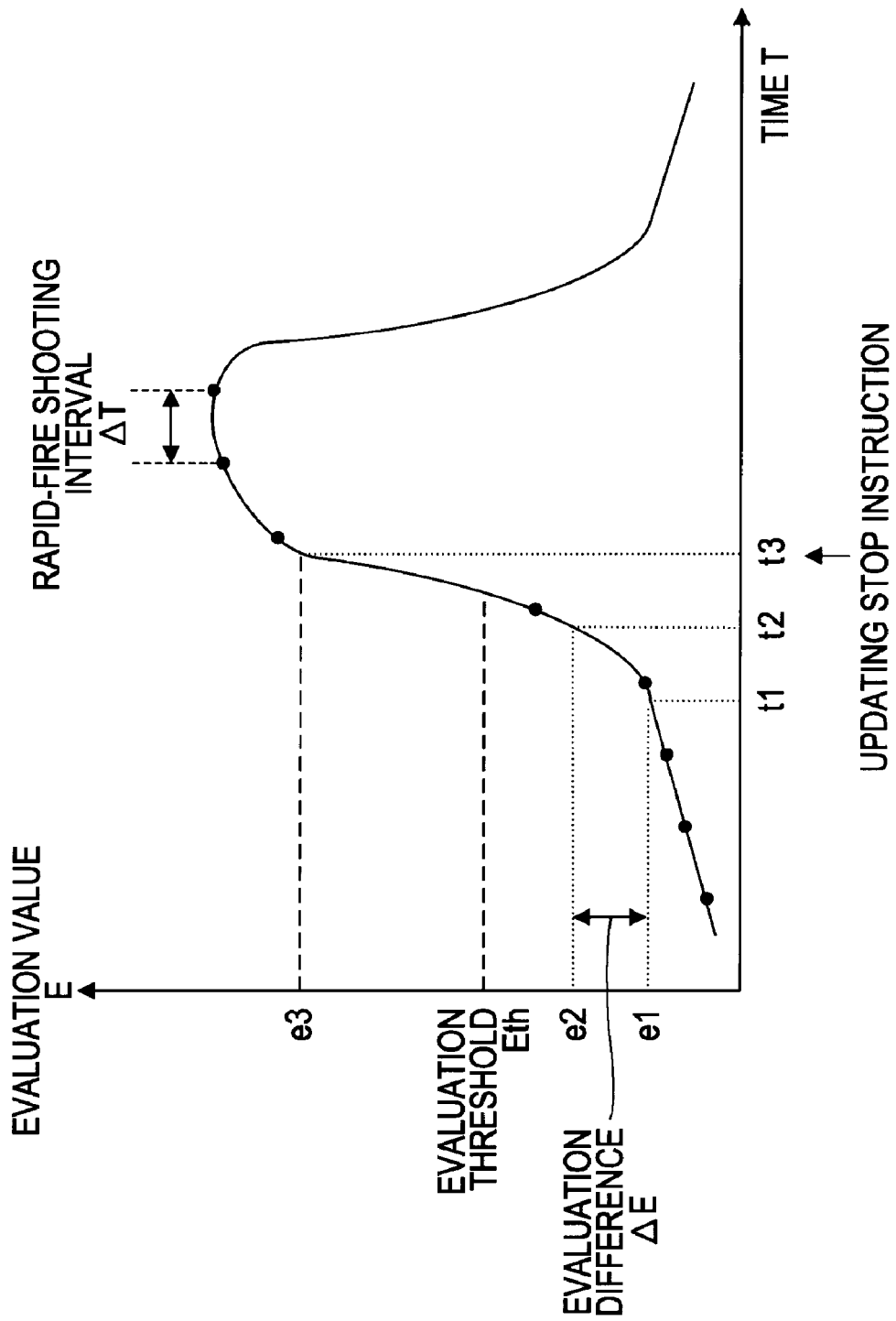
FIG. 9 is a graph showing another example of a curve representing temporal change in facial expression correlation in this embodiment.

FIG. 9 is a graph showing another example of a curve representing temporal change in facial expression correlation in this embodiment. In this example, a timing of instruction for stopping updating and a time interval of rapid-fire shooting are shown. The notations and axis names in the graph are the same as those in FIG. 8.

The estimation of a facial expression according to this curve is executed similarly to the case described with reference to FIG. 8, but the method of storing images differs. Referring to FIG. 9, images are stored regularly from a timing previous to time t1, and when the amount of the images stores has reached a maximum storage capacity of the image storage unit 140 of the imaging device 100, control is exercised so that the images are sequentially discarded from the image stored earliest and latest images are maintained. This control is referred to as image updating. Referring to FIG. 9, as a counterpart to the rapid-fire shooting instruction shown in FIG. 8, an instruction for stopping image updating is issued at time t3, so that images representing facial expressions on and after time t3 are maintained according to the stop instruction. The timings at which the images are stored are indicated by black dots. In this example, the maximum storage capacity of the image storage unit 140 corresponding to three pieces of image data.

Figure 10:
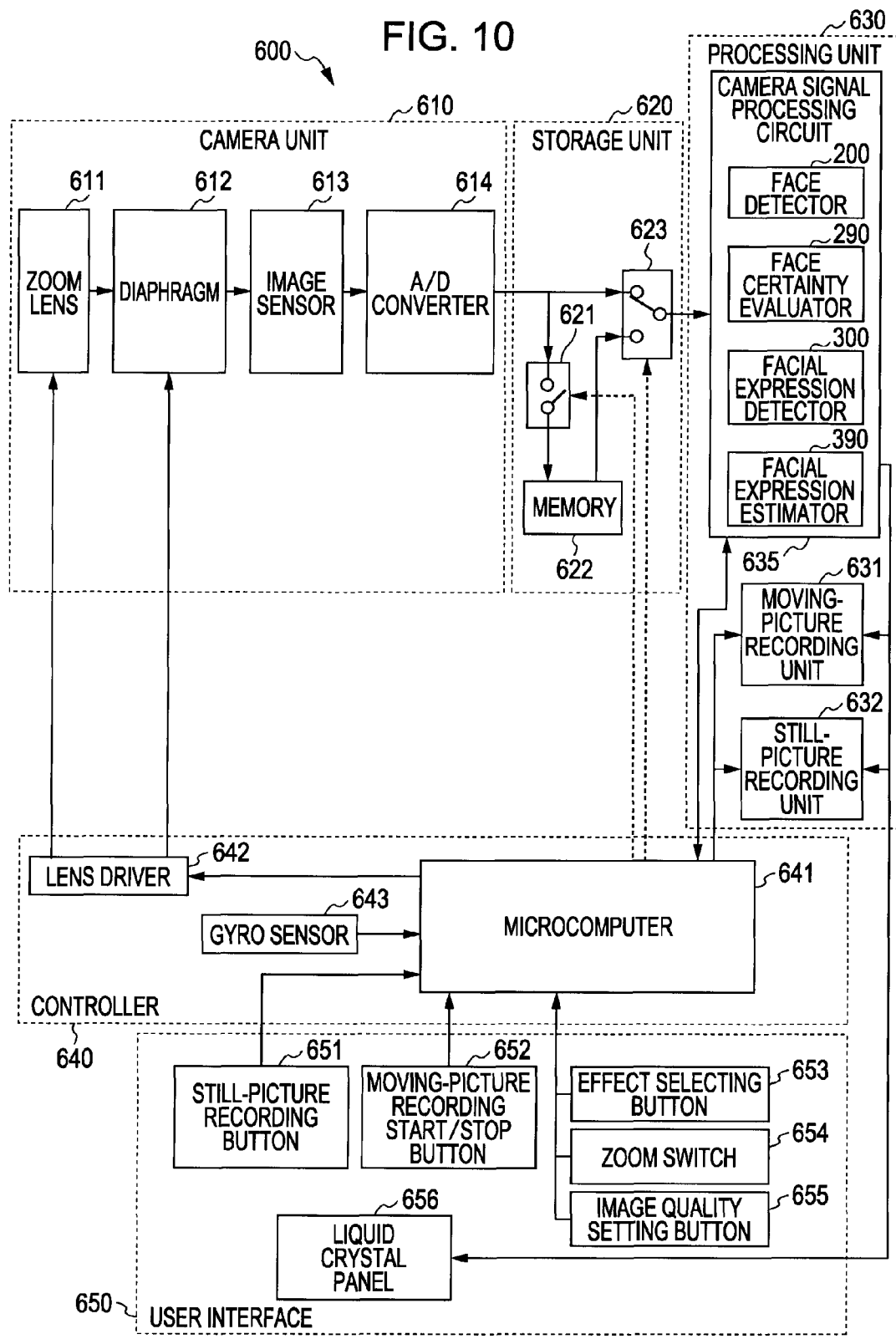
FIG. 10 is a diagram showing an example of an image storage device according to a modification of the embodiment.

FIG. 10 is a diagram showing an image storage device 600 as an example of modification of this embodiment. The image storage device 600 includes a camera unit 610, a storage unit 620, a processing unit 630, a controller 640, and a user interface 650.

The camera unit 610 captures images of an object and generates corresponding moving-picture data. The camera unit 610 includes a zoom lens 611, a diaphragm 612, an image sensor 613, and an A/D converter 614. The zoom lens 611 is a set of lenses for capturing images of an object. The zoom lens 611 continuously changes its focal depth by changing the distance between lenses according to control signals supplied from the controller 640. Light reflected from an object enters through the set of lenses. The diaphragm 612 adjusts the amount of light that enters through the zoom lens 611 according to control signals supplied from the controller 640, similarly to the zoom lens 611. The image sensor 613 causes the incident light having passed through the zoom lens 611 and the diaphragm 612 to form an image thereon, and outputs images of the object as moving-picture data. The A/D converter 614 converts the moving-picture data supplied from the image sensor 613 from analog signals into digital signals. The moving-picture data generated by the camera unit 610 is supplied to the storage unit 620.

The storage unit 620 receives the moving-picture data supplied from the camera unit 610, and temporarily stores the moving-picture data according to control signals supplied from the controller 640. The storage unit 620 includes a contact point 621, a memory 622, and a switching contact point 623. The opening and closing of the contact point 621 and the switching contact point 623 is controlled by the controller 640 so that the moving-picture data supplied from the camera unit 610 is supplied to the processing unit 630 via the switching contact point 623. Furthermore, when the contact point 621 is closed, the moving-picture data supplied from the camera unit 610 is temporarily stored in the memory 622 and then supplied to the processing unit 630.

The contact point 621 is an electrical contact point that is opened or closed according to a control signal supplied from the controller 640. When the contact point 621 is closed, the moving-picture data is supplied to the memory 622. The switching contact point 623 is an electrical contact point that is switched according to a control signal supplied from the controller 640. By the switching of the switching contact point 623, either the moving-picture data supplied from the memory 622 or the moving-picture data supplied from the A/D converter 614 is supplied to the processing unit 630.

The processing unit 630 executes image processing for moving-picture recording or image processing for still-picture recording on the moving-picture data supplied from the storage unit 620, according to a control signal for moving-picture recording or still-picture recording supplied from the controller 640, and records the resulting image data as a moving picture or a still picture accordingly. The image processing for moving-picture recording and the image processing for still-picture recording are not executed simultaneously, and only either one is executed. Now, an example of switching from the image processing for moving-picture recording to the image processing for still-picture recording in the processing unit 630 will be described.

When the recording of a moving picture has been started in response to a user's instruction for starting moving-picture recording, the moving-picture data output from the camera unit 610 is supplied from the switching contact point 623 to the processing unit 630, not via the memory 622 of the storage unit 620. Then, the processing unit 630 executes image processing for moving-picture recording on the moving-picture data. Concurrently with the image processing for moving-picture recording, the processing unit 630 executes face detection and facial expression detection to estimate a facial expression. If it is determined by the estimation that the facial expression becomes closer to the reference facial expression, the processing unit 630 supplies information representing the result of estimation to the controller 640. Accordingly, the controller 640 controls the storage unit 620 so that the contact point 621 is closed. Thus, the moving-picture data supplied from the camera unit 610 is temporarily stored in the memory 622.

Furthermore, when the recording of a moving picture has been stopped in response to a user's instruction for stopping moving-picture recording, the moving-picture data stored in the memory 622 during the period from the estimation of a facial expression to the end of moving-picture recording is supplied to the processing unit 630. The processing unit 630 executes image processing for still-picture recording on the moving-picture data supplied from the memory 622 of the storage unit 620, and records the resulting data as a still picture. The opening or closing of the contact point 621 and the switching contact point 623 is controlled by the controller 640 independently of each other. For example, the contact point 621 is closed on the basis of estimation of a facial expression after the start of moving-picture recording, and is opened after the end of moving-picture recording. The switching contact point 623 is switched according to the presence or absence of moving-picture data in the memory 622 at the start of moving-picture recording and during the stop of moving-picture recording.

The processing unit 630 includes a camera signal processing circuit 635, a moving-picture recording unit 631, and a still-picture recording unit 632. The camera-signal processing circuit 635 includes a face detector 200, a face certainty evaluator 290, a facial expression detector 300, and a facial expression estimator 390.

The camera-signal processing circuit 635 executes gamma correction, automatic gain control (AGC), and so forth on the moving-picture data supplied from the storage unit 620, and also executes predetermined moving-picture encoding (e.g., MPEG (Moving Picture Experts Group) encoding). Thus, for example, the moving-picture data is encoded into a format compliant with the Digital Video (DV) standard. This is the image processing for moving-picture recording, and the encoded moving-picture data is supplied to the moving-picture recording unit 631. Alternatively, instead of the processing described above, the camera-signal processing circuit 635 similarly executes gamma correction, automatic gain control, and so forth on the moving-picture data supplied from the storage unit 620, and also executes predetermined still-picture encoding. Furthermore, the camera-signal processing circuit 635 executes compression so that, for example, the moving-picture data is encoded into a format compliant with the JPEG (Joint Photographic Experts Group) standard. This is the image processing for still-picture recording, and the encoded still-picture data is supplied to the still-picture recording unit 632.

The moving-picture recording unit 631 is a storage medium dedicated to encoded moving-picture data. The still-picture recording unit 632 is a storage medium dedicated to encoded still-picture data. These storage media are, for example, storage tapes, digital versatile discs (DVDs), or hard discs.

The user interface 650 provides an interface to the user of the image storage device 600. The user interface 650 supplies an instruction from the user to the controller 640, and presents the user with an image corresponding to the moving-picture data supplied from the processing unit 630. The user interface 650 includes a still-picture recording button 651, a moving-picture recording start/stop button 652, an effect selecting button 653, a zoom switch 654, an image quality setting button 655, and a liquid crystal panel 656.

The still-picture recording button 651 is operated when the user issues an instruction for recording a still picture. For example, when the still-picture recording button 651 is pressed during recording of a moving picture, captured image data is temporarily stored in the memory 622 of the storage unit 620 concurrently with the processing for moving-picture recording in the processing unit 630. When the processing for moving-picture recording is stopped, the processing of still-picture recording is executed on the image data temporarily stored in the memory 622.

The moving-picture recording start/stop button 652 is operated when the user issues an instruction for starting or stopping the image processing for moving-picture recording. The processing for moving-picture recording is started when the moving-picture recording start/stop button 652 is first pressed, and the moving-picture recording is stopped when the moving-picture recording start/stop button 652 is pressed next time.

The effect selecting button 653 is operated when the user issues a request for changing effects. The effects herein refer to effects of image display, such as "taste of oil-painting" or "taste of old picture".

The zoom switch 654 is operated when the user issues an instruction for changing the focal depth. The user can change the focal depth of the zoom lens 611 as desired by pressing the zoom switch 654.

The image quality setting button 655 is operated when the user issues a request for setting a level of image quality. For example, the user can set a desired image quality among high quality, intermediate quality, and low quality by pressing the image quality setting button 655.

The liquid crystal panel 656 is a display section of a liquid crystal display. The liquid crystal panel 656 presents the user with an image displayed. For example, during recording of a moving picture, the liquid crystal panel 656 displays the moving picture that is being recorded.

The controller 640 controls processing in the storage unit 620 and the processing unit 630. The controller 640 includes a microcomputer 641, a lens driver 642, and a gyro sensor 643. The microcomputer 641 is a small data processing device including a central processing unit and a storage unit. The microcomputer 641 automatically executes input, calculation, processing, and output of data. The lens driver 642 is software that controls the zoom lens 611 and the diaphragm 612. The gyro sensor 643 measures shaking during imaging.

The controller 640 controls imaging by the camera unit 610. More specifically, the controller 640 changes the focal depth of the zoom lens 611 to change an imaging area in a range of full view to close up, and adjusts the diaphragm 612 to restrict the amount of incident light during imaging. Furthermore, the controller 640 controls storage by the storage unit 620. More specifically, the controller 640 controls whether to store the moving-picture data supplied from the camera unit 610 in the memory 622 by opening or closing the contact point 621 and the switching contact point 623.

Furthermore, the controller 640 controls processing of moving-picture data by the processing unit 630. More specifically, the controller 640 supplies parameters defining image processing for moving-picture recording or still-picture recording to the processing unit 630. Then, the controller 640 controls the storage unit 620 according to a result of facial expression estimation by the facial expression estimator 390. Accordingly, the contact point 621 is closed, so that the moving-picture data supplied from the camera unit 610 is stored in the memory 622.

Furthermore, the controller 640 accepts instructions according to operations of the user interface 650, and controls the camera unit 610, the storage unit 620, and the processing unit 630 according to the instructions. For example, when the zoom switch 654 is operated, the controller 640 controls the camera unit 610 so that the focal depth is changed. When the still-picture recording button 651 is operated, the controller 640 controls the storage unit 620 so that the moving-picture data is temporarily stored, and supplies an image processing parameter for still-picture recording to the processing unit 630.

The controller 640 detects the amount of camera shake during imaging on the basis of an input from the gyro sensor 643. For example, the amount of camera shake is used to calculate an amount of correction for properly correcting the position of an object that has been deviated by camera shaking.

Figure 11:
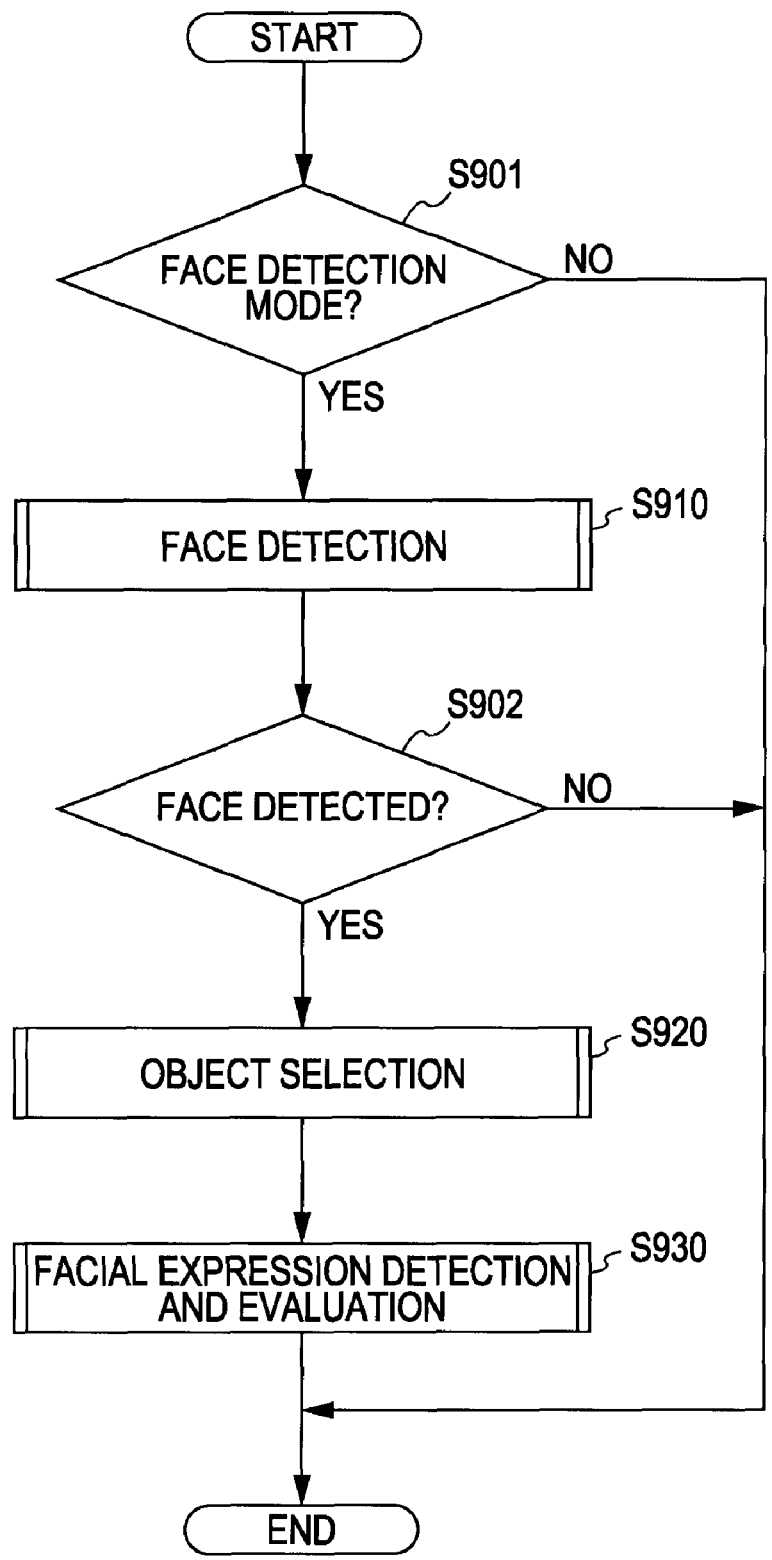
FIG. 11 is a flowchart showing an example of a process (main routine) that is executed by a computer of the imaging device according to the embodiment.

FIG. 11 is a flowchart showing an example of a process (main routine) executed by a computer of the imaging device 100 in this embodiment. First, it is checked whether the current operation mode is the face detection mode (step S901). If the current operation mode is the face detection mode, face detection is executed (step S910). If the current operation mode is not the face detection mode, the process is exited. After completion of the face detection (step S910), it is checked whether a face has been detected (step S902). If a face has been detected, object selection (step S920) and facial expression evaluation (step S930) are executed. The process is then exited. If it is determined that no face has been detected (step S902), the process is exited immediately.

Figure 12:
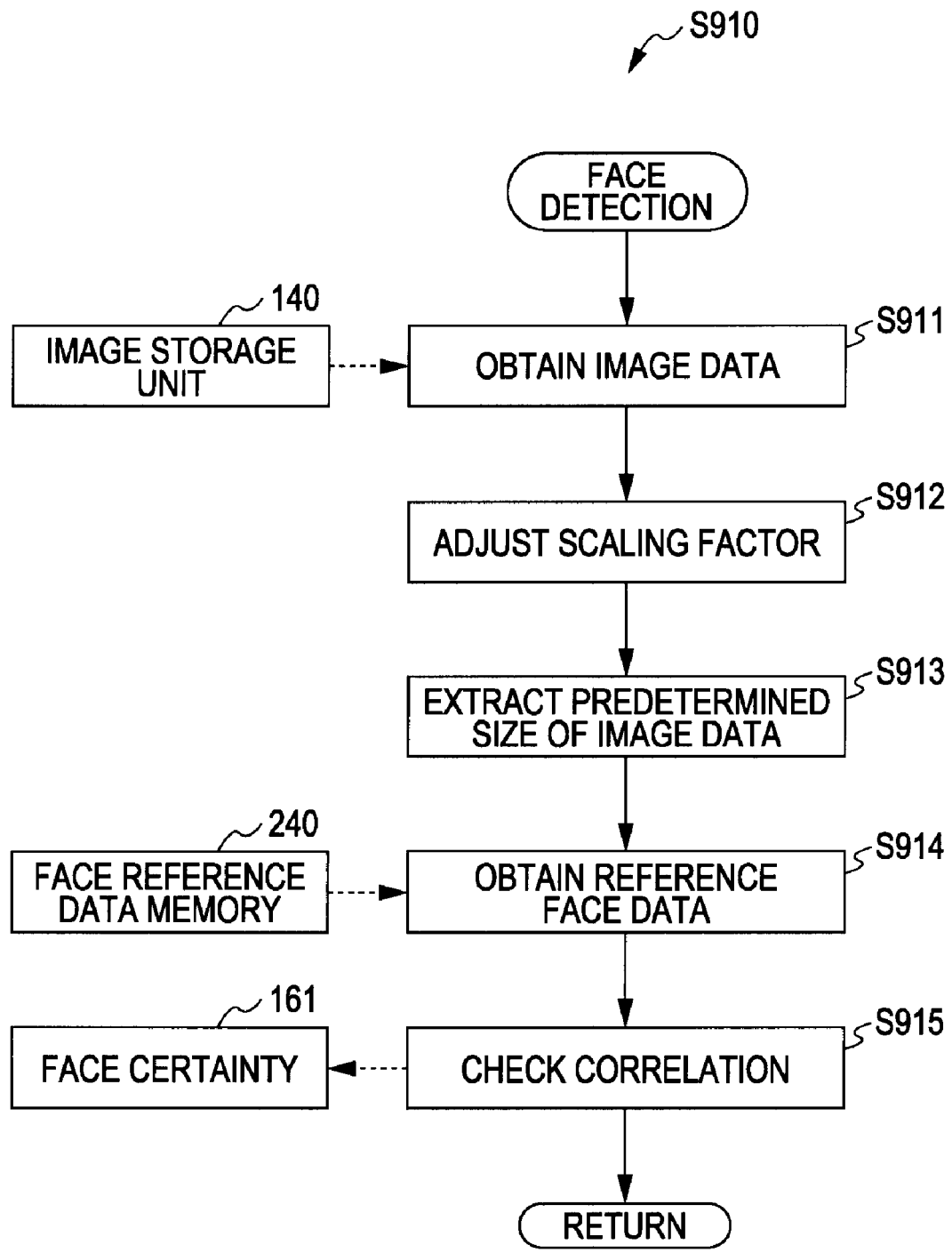
FIG. 12 is a flowchart showing a procedure of face detection in the embodiment.

FIG. 12 is a flowchart showing a procedure of the face detection (step S910) in this embodiment. This is a subroutine executed in the process (main routine) executed by the imaging device 100.

First, image data that is used as a subject of face detection is obtained from the image storage unit 140 (step S911). Then, enlarging or reducing is executed so that face images of various sizes in the image data are enlarged or reduced to a predetermined size (step S912). Then, image data of a predetermined size is extracted so that the face size of the image data matches the face size of the face reference data (step S913).

Then, the face reference data is obtained from the reference data memory 240 of the face detector 200 (step S914). A face certainty is estimated on the basis of the face reference data and the image data described above, and the result of the estimation is supplied to the face certainty 161 of the data memory 160 (step S915).

Figure 13:
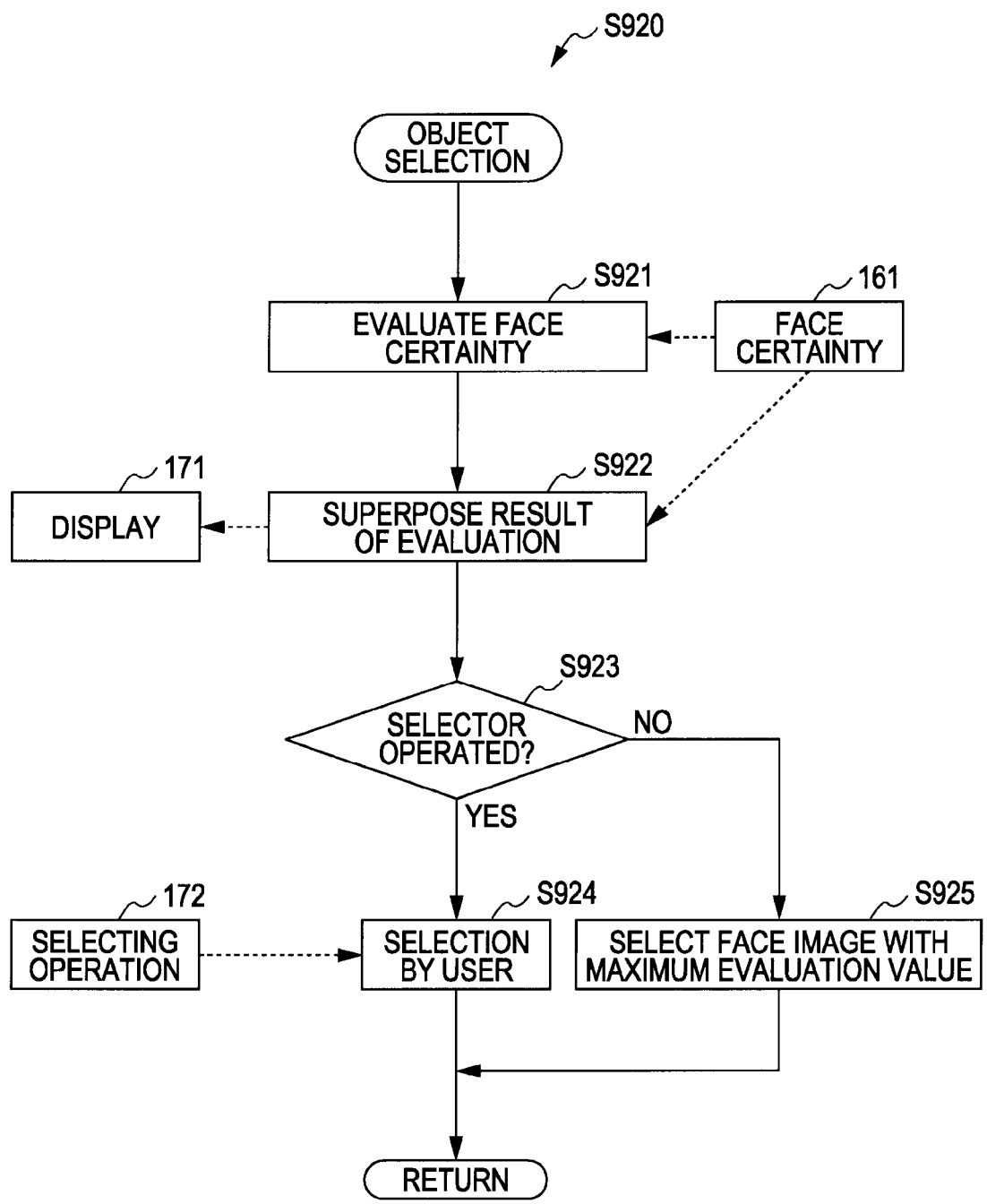
FIG. 13 is a flowchart showing a procedure of object selection in the embodiment.

FIG. 13 is a flowchart of a procedure of object selection (step S920) executed in this embodiment. This is a subroutine that is executed in the process (main routine) executed by the imaging device 100.

First, on the basis of the result of estimation of face certainty, obtained from the face certainty 161 of the data memory 160, evaluation of face certainty is executed for each piece of image data (step S921), and the result of the evaluation is supplied to the controller 150. The evaluation herein refers to evaluation of face certainty, for example, indicating which face image has a highest face certainty. According to the result of the evaluation, the result of evaluation is superposed on the face image of the image data displayed on the display 171 (step S922). For example, when a plurality of face images exist, the frame of a face image with a highest evaluation of face certainty is visually highlighted while the other frames are displayed normally. Furthermore, the user can select any one of the faces at the user's discretion by moving the superposed frame.

More specifically, it is checked whether an instruction for moving the frame has been issued to the selection accepting unit 172 (step S923). When an instruction for moving the frame has been issued, the face specified by the instruction is selected (step S924). On the other hand, when no instruction for moving the frame has been issued to the selection accepting unit 172, a specific face is selected according to the result of the evaluation (step S925). For example, the specific face is a face with a highest face certainty, i.e., the face image with the visually highlighted superposed frame (step S922).

Figure 14:
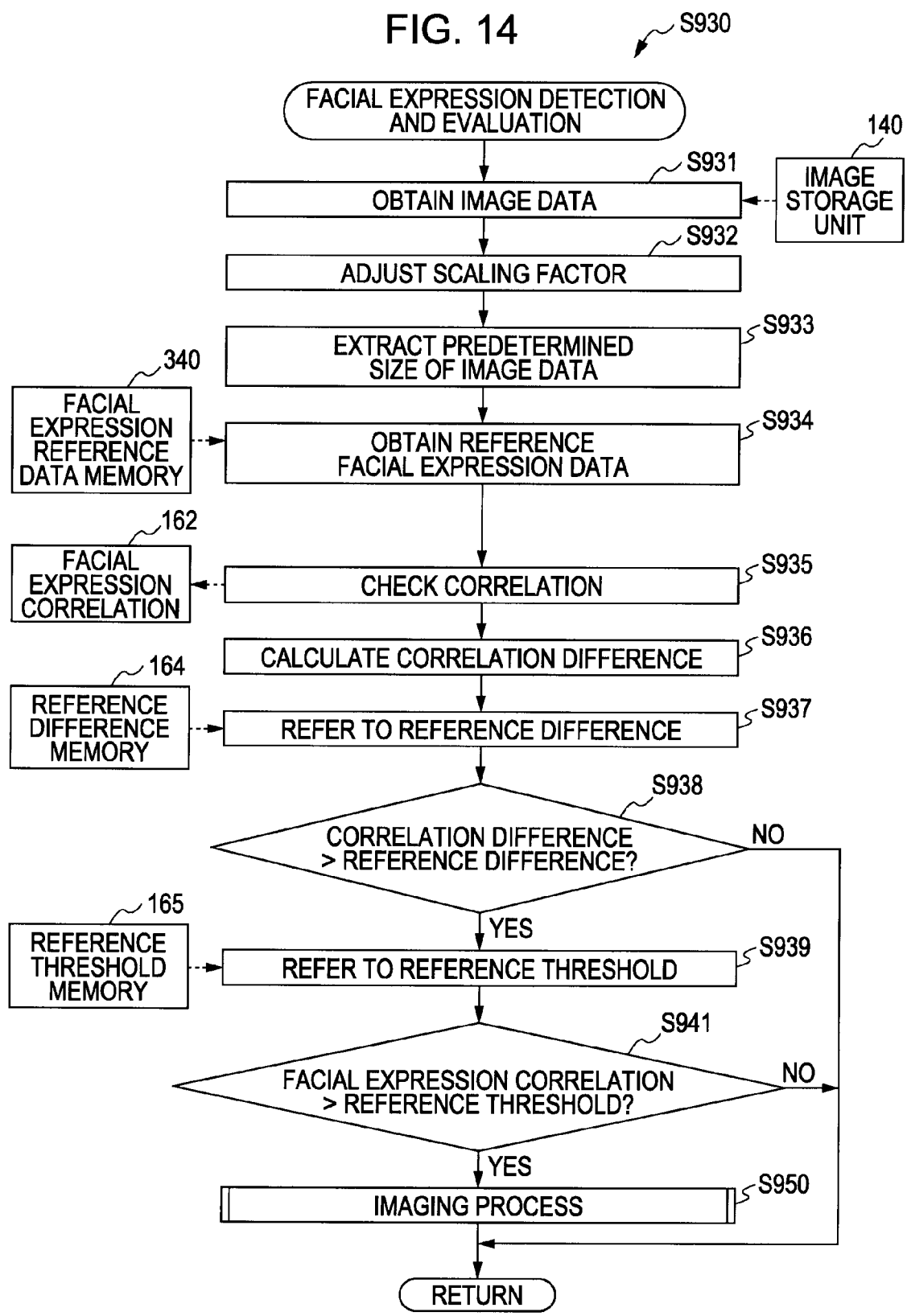
FIG. 14 is a flowchart showing a procedure of facial expression detection and evaluation in the embodiment.

FIG. 14 is a flowchart showing a procedure of the facial expression detection and evaluation (step S930) in this embodiment. This is a subroutine executed in the process (main routine) executed by the imaging device 100.

First, image data that is used as a subject of facial expression detection is obtained from the image storage unit 140 (step S931). Then, enlarging or reducing is executed so that face images of various sizes in the image data are enlarged or reduced to a predetermined size (step S932). Then, image data of a predetermined size is extracted so that the face size of the image data matches the face size of the facial expression reference data (step S933).

Then, reference data of facial expression (reference face expression) are obtained from the reference data memory 340 of the facial expression detector 300 (step S934). A facial expression correlation for the specified facial expression type (e.g., "Laughing") is estimated on the basis of the reference facial expression and the image data described above, and the result of the estimation (facial expression correlation) is supplied to the facial expression correlation 162 of the data memory 160 (step S935).

Then, a difference in facial expression correlation before and after a temporal change in the image data is calculated (step S936). Then, the reference difference in the reference difference 164 of the data memory 160 is referred to (step S937), and the relationship between the difference in facial expression correlation and the reference difference is checked (step S938). If the difference in facial expression correlation exceeds the reference difference, the reference threshold is referred to (step S939). On the other hand, if the difference in facial expression correlation does not exceed the reference difference, the procedure immediately returns to the main routine.

After the reference threshold in the reference threshold 165 of the data memory 160 is referred to (step S939), the relationship between the facial expression correlation and the reference threshold is checked (step S941). If the facial expression correlation exceeds the reference threshold, an imaging process (step S950) is further called as a subroutine. On the other hand, if the facial expression correlation does not exceed the reference threshold, the procedure immediately returns to the main routine.

Figure 15:
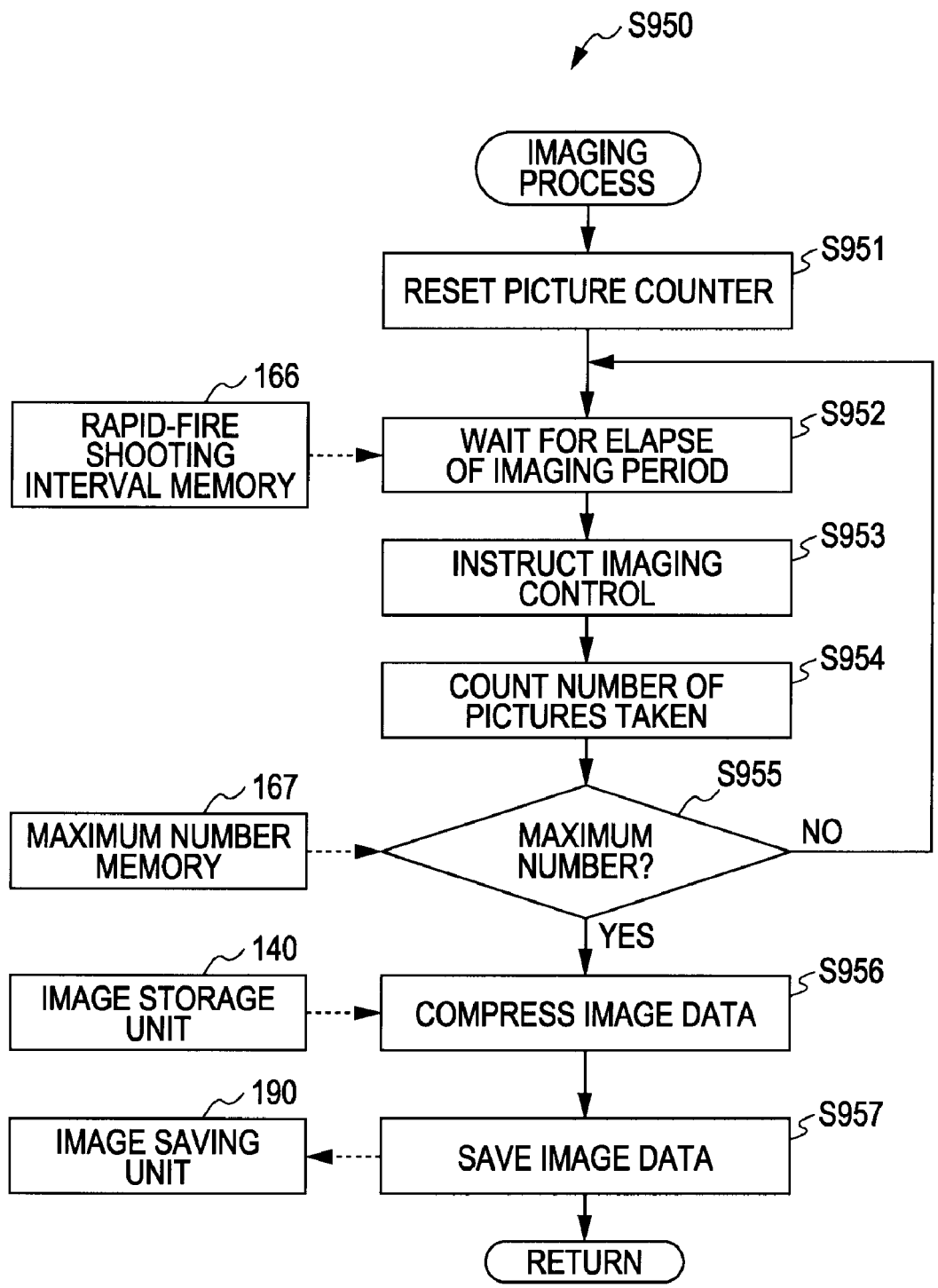
FIG. 15 is a flowchart showing a procedure of an imaging process in the embodiment.

FIG. 15 is a flowchart showing a procedure of the imaging process (step S950) in this embodiment. This is a subroutine executed in the process (main routine) executed by the imaging device 100.

First, a picture counter that counts the number of pictures taken is reset (step S951). Then, the rapid-fire shooting interval 166 of the data memory 160 is referred to, and a timing of imaging is waited for until elapse of the rapid-fire shooting interval (step S952). After the elapse of the rapid-fire shooting interval, an instruction for imaging control is issued (step S953). The imaging control herein refers to storing image data output from the imaging unit 110 in the image storage unit 140 via the signal processor 120. After the imaging control, the number of pictures taken is counted (step S954).

Then, the maximum number 167 of the data memory 160 is referred to, and the relationship between the number of pictures taken and the maximum number is checked (step S955). If the number of pictures taken exceeds the maximum number, the image data stored in the image storage unit 140 according to the imaging control instruction (step S953) described above is supplied to the image compander 180, where the image data is compressed (step S956).

If the number of pictures taken does not exceed the maximum number as a result of checking the relationship between the number of pictures taken and the maximum number (step S955), the procedure immediately returns to the waiting for an imaging timing described above (step S952).

After the image data compression (step S956), the compressed image data is supplied to and saved in the image saving unit 190 (step S957).

Figure 16:
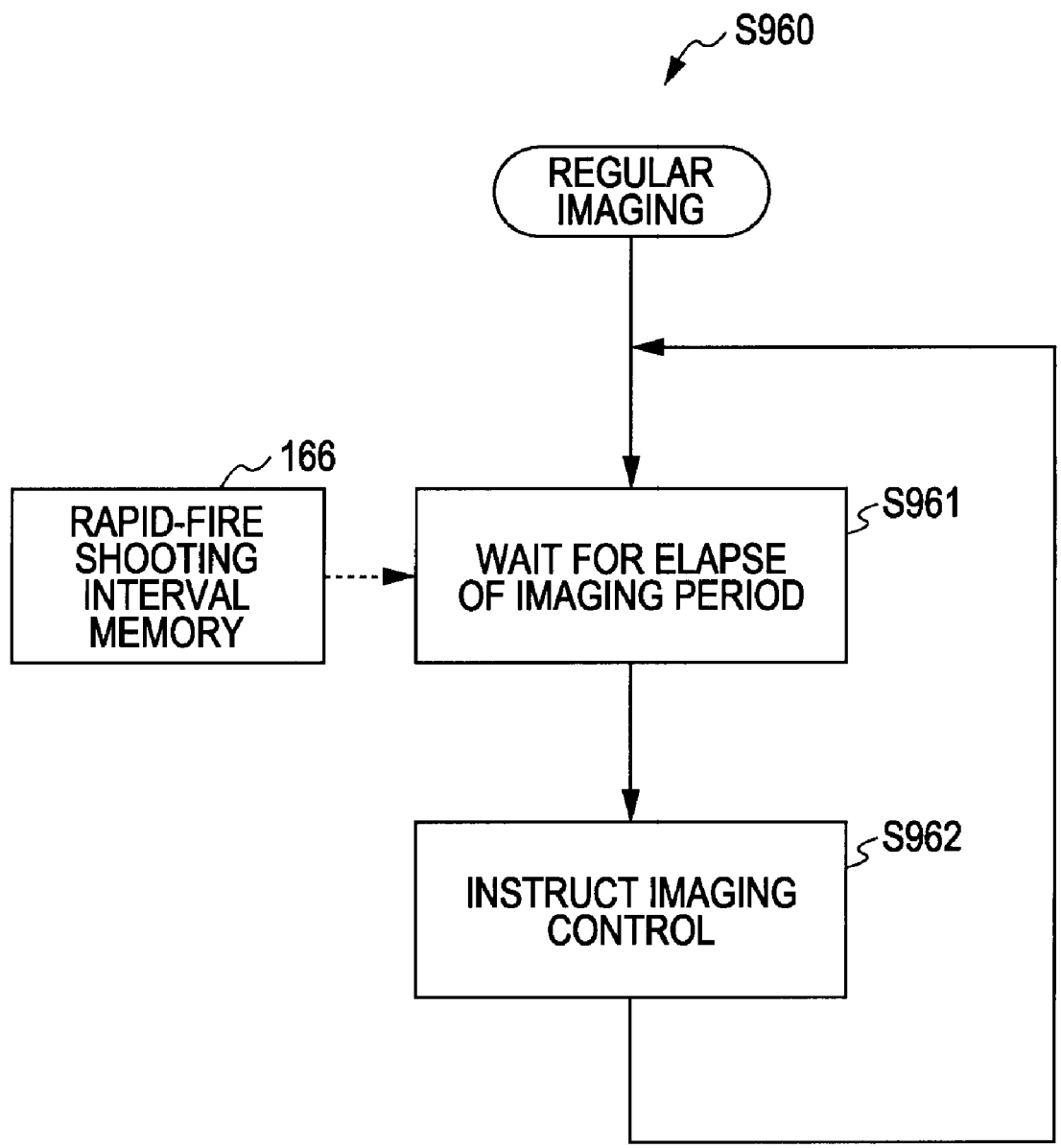
FIG. 16 is a flowchart showing a procedure of regular imaging in the embodiment.

FIG. 16 is a flowchart showing a procedure of regular imaging (step S960) in this embodiment. This is a loop that is executed independently of the process (main routine) executed by the imaging device 100.

Figure 17:
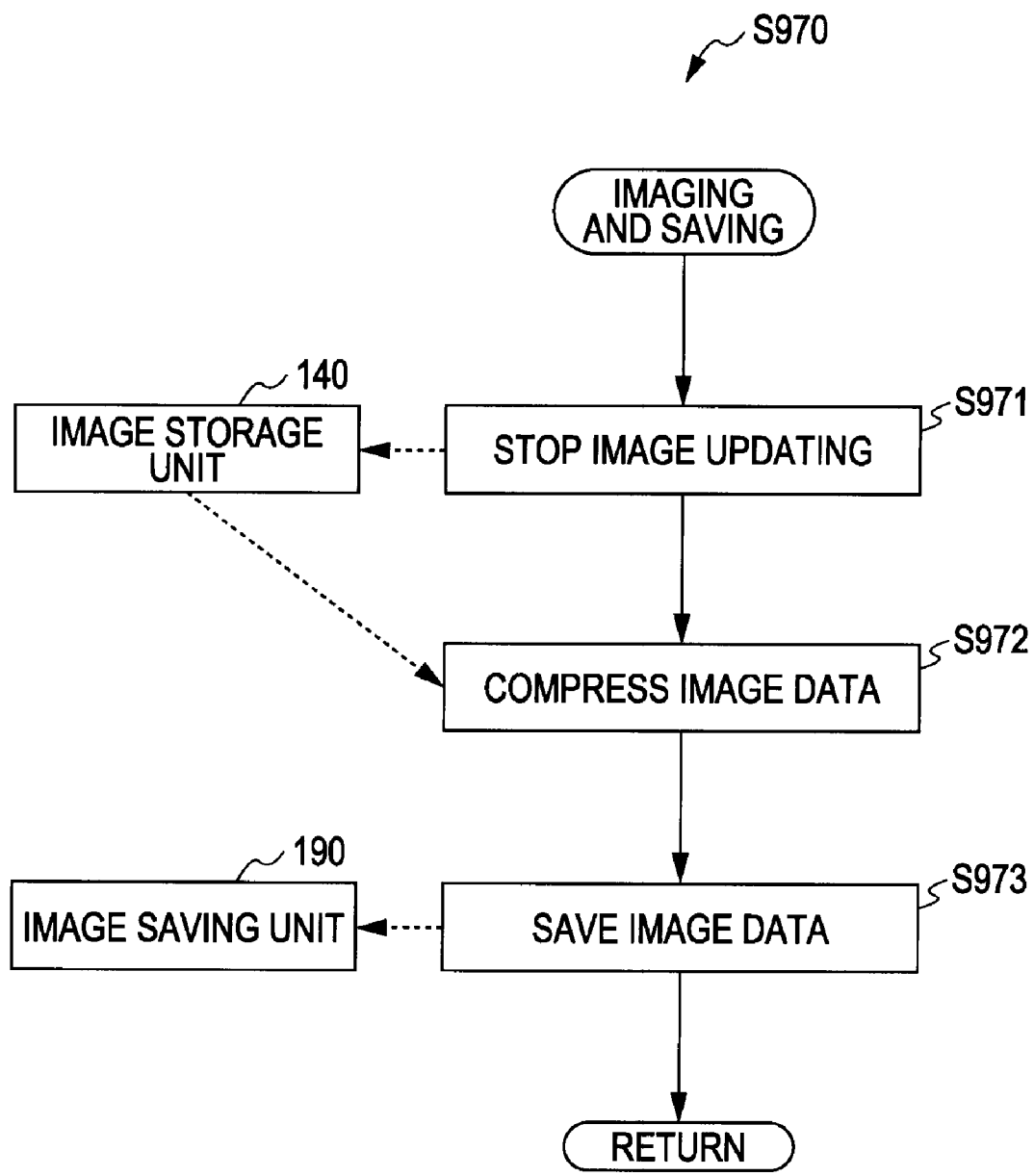
FIG. 17 is a flowchart showing a procedure of imaging and saving in the embodiment.

First, the rapid-fire shooting interval 166 of the data memory 160 is referred to, and a timing of imaging is waited for until the elapse of the rapid-fire shooting interval (step S961). After the elapse of the rapid-fire shooting interval, an instruction for imaging control is issued (step S962). The instruction for imaging control is similar to the instruction for imaging control in FIG. 15 (step S953). The image data stored in the image storage unit 140 by the regular imaging (step S960) is updated as described earlier. More specifically, when the total amount of the image data has reached the maximum storage capacity of the image storage unit 140, images are deleted sequentially from the image stored earliest and the latest images are maintained. FIG. 17 is a flowchart showing a procedure of the imaging and saving in this embodiment. This is a modification of a part of the imaging process (step S950) shown in FIG. 15 in the process (main routine) executed by the imaging device 100. The image data used as a subject of processing is image data stored in the image storage unit 140 by the regular imaging shown in FIG. 16 (step S960).

First, an instruction for stopping image updating in the image storage unit 140 of the imaging device 100 is issued (step S971). Thus, image data intended by the user is maintained in the image storage unit 140. Then, the image data maintained in the image storage unit 140 is supplied to the image compander 180, where the image data is compressed (step S972). The compressed image data is supplied to and saved in the image saving unit 190 (step S973).

Figure 18:
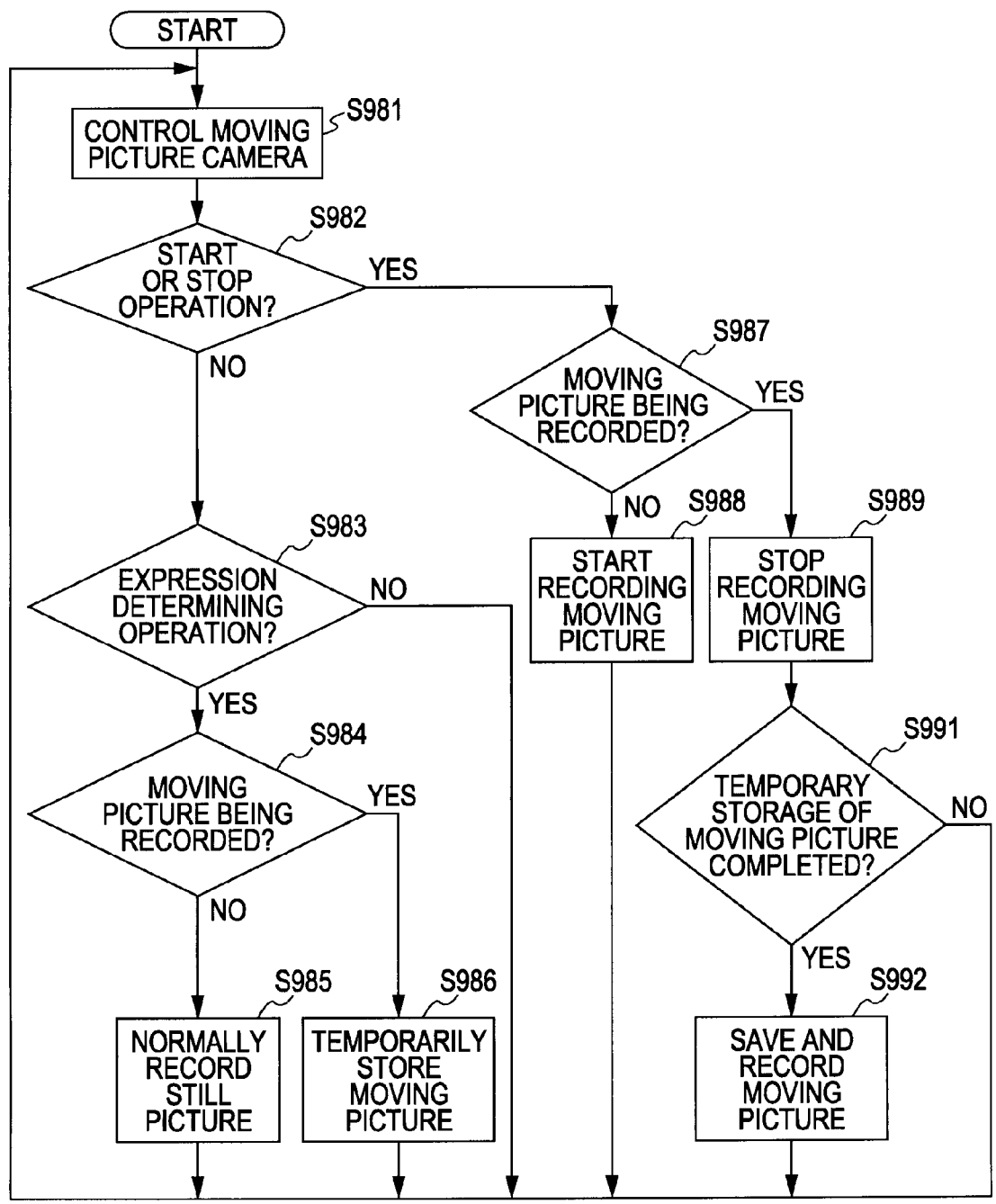
FIG. 18 is a flowchart showing an example of a process (main routine) that is executed by a computer of the image storage device according to the modification of the embodiment.

FIG. 18 is flowchart showing an example of a process (main routine) that is executed by a computer of the image storage device 600 according to the modification of the embodiment.

First, the camera unit 610 of the image storage device 600 is controlled (step S981) so that, for example, the focal depth of the zoom lens 611 is changed and so that the amount of light that enters through the diaphragm 612 is restricted. Then, a user's instruction to the moving-picture recording start/stop button 652 of the user interface 650 is checked (step S982). If no instruction has been detected, the user has not instructed either starting or stopping. On the other hand, if an instruction has been detected, the user has instructed either starting or stopping. If no instruction has been detected, a facial expression is estimated (step S983). The facial expression estimation determines whether a facial expression in moving-picture data becomes resemblant to the reference facial expression within a predetermined period.

If it is determined in the facial expression estimation (step S983) that that the facial expression becomes resemblant to the reference facial expression, then, it is checked whether a moving-picture recording operation is being executed (step S984). If it is determined that a moving-picture recording operation is not being executed, the moving-picture data is recorded as a still picture (step S985). More specifically, the moving-picture data generated by the camera unit 610 is supplied to the processing unit 630 without being stored in the memory 622 in the storage unit 620. Then, the processing unit 630 executes image processing for still-picture recording on the moving-picture data, and records the resulting data as a still picture (step S985). On the other hand, if it is determined that a moving-picture recording operation is being executed (step S984), storage of moving-picture data is executed (step S986). More specifically, the moving-picture data generated by the camera unit 610 is temporarily stored in the memory 622.

If it is determined in the facial expression estimation (step S983) that the facial expression does not become resemblant to the reference facial expression, immediately, control is exercised on the camera unit 610 (step S981).

If it is determined that the user has issued an instruction for starting or stopping to the moving-picture recording start/stop button 652 (step S982), then, it is checked whether a moving-picture recording operation is being executed (step S987). If it is determined that a moving-picture recording operation is not being executed, moving-picture recording of the moving-picture data is started (step S988). More specifically, the moving-picture data generated by the camera unit 610 is supplied to the processing unit 630 without being stored in the memory 622 in the storage unit 620. Then, the processing unit 630 executes image processing for moving-picture recording on the moving-picture data, and starting recording the resulting data as a moving picture. On the other hand, if it is determined that a moving-picture recording operation is being executed (step S987), the processing unit 630 stops the moving-picture recording (step S989). Then, the moving-picture recording is suspended.

When the moving-picture recording is suspended, it is checked whether the moving-picture data generated by the camera unit 610 has been stored in the memory 622 (step S991). If the storage of the moving-picture data has been completed, the processing unit 630 saves and records a still picture (step S992). More specifically, the moving-picture data stored in the memory 622 is supplied to the processing unit 630. Then, the processing unit 630 executes image processing for still-picture recording on the moving-picture data, and records the resulting data as a still picture.

As described above, according to the embodiment, the imaging device 100 can estimate whether a facial expression in image data and a reference facial expression come to have a predetermined correlative relationship within a predetermined period. Thus, it is possible to store image data including a facial expression most resemblant to the reference facial expression on the basis of the estimation.

That is, it is possible to estimate temporal change in image data and to record an image intended by the user.

Although the embodiment has been described in the context of an example where change in facial expression in image data is detected, without limitation to facial expression, for example, change in human figure may be detected.

As described above, according to the embodiment, regarding facial expression in image data, the facial expression detector 300 estimates a facial expression correlation, the facial expression estimator 390 estimates whether the facial expression correlation and the reference facial expression come to have a predetermined correlative relationship within a predetermined period, and image data in the predetermined period is stored in the image storage unit 140 on the basis of the estimation. Thus, the user can record intended image data.

The embodiment described above is only an example of implementation of the present invention, and components in the embodiment correspond to elements in claims as described below. However, without limitation, various modifications can be conceived without departing from the spirit of the present invention.

Facial-expression-correlation estimating means in claims corresponds to, for example, the facial expression detector 300. Facial-expression estimating means in claims corresponds to, for example, the facial expression estimator 390. Image-data storage means in claims corresponds to, for example, the image storage unit 140. Image-storage controlling means in claims corresponds to, for example, the controller 150.

Moving-picture-data storage means in claims corresponds to, for example, the memory 622.

Face-image detecting means in claims corresponds to, for example, the face detector 200.

Face-certainty evaluating means in claims corresponds to, for example, the face certainty evaluator 290.

Selection accepting means in claims corresponds to, for example, the selection accepting unit 172.

Imaging means in claims corresponds to, for example, the imaging unit 110.

Estimating a facial expression correlation in claims corresponds to, for example, step S935. Estimating a facial expression in claims corresponds to, for example, step S938, or steps S938 and S941. Controlling image storage corresponds to, for example, step S935, or steps S962 and S971.

The procedures of processing in the embodiment described above may be considered as a method including the series of procedures, as a program for causing a computer to execute the series of procedures, or a recording medium having the program recorded thereon.

What is claimed is:

1. An image storage device comprising:
    facial-expression-correlation estimating means for estimating a facial expression correlation representing a degree of correlation between a facial expression in a face image and a predetermined reference facial expression, the face image being included in time-varying image data;
    facial-expression estimating means for detecting, through estimation based on transition of the facial expression correlation, a situation where the facial expression in the face image and the predetermined reference facial expression have a predetermined correlative relationship including a (i) gradient of change in the facial expression correlation exceeds a predetermined value or (ii) the facial expression correlation exceeds a predetermined degree, within a predetermined period; and
    image-storage controlling means for exercising control so that a rapid fire image shooting and storing is performed during a given period, when the predetermined correlative relationship is detected by the facial-expression estimating means,
    wherein the facial-expression estimating means continuously detects, while the image-storing controlling means exercises control to perform rapid fire image shooting and storing, for the situation where the facial expression in the face image and the predetermine reference facial expression have a predetermined correlative relationship.

2. The image storage device according to claim 1, wherein the facial-expression estimating means detects that the facial expression in the face image and the predetermined reference facial expression have the predetermined correlative relationship when the gradient of change in the facial expression correlation exceeds a predetermined value and the facial expression correlation exceeds the predetermined degree.

3. The image storage device according to claim 1, wherein the image-storage controlling means exercises control so that a plurality of pieces of the image data in the predetermined period from the detection are maintained in the image-data storage means.

4. The image storage device according to claim 1, further comprising:
    moving-picture-data storage means for storing the image data as moving-picture data,
    wherein the image-storage controlling means causes the image data in the predetermined period from the detection to be saved from the moving-picture data storage means to the image data storage means.

5. The image storage device according to claim 1, wherein the image-storage controlling means exercises control so that the rapid fire image shooting and storing is initiated before the correlative relationship between the facial expression in the face image and the predetermined reference facial expression is maximized.

6. An image storage device comprising:
    face-image detecting means for detecting a face image included in time-varying image data;

facial-expression-correlation estimating means for estimating a facial expression correlation representing a degree of correlation between a facial expression in the detected face image and a predetermined reference facial expression;

facial-expression estimating means for detecting, through estimation based on transition of the facial expression correlation, a situation where the facial expression in the face image and the predetermined reference facial expression have a predetermined correlative relationship including a (i) gradient of change in the facial expression correlation exceeds a predetermined value or (ii) the facial expression correlation exceeds a predetermined degree, within a predetermined period; and image-storage controlling means for exercising control so that a rapid fire image shooting and storing is performed during a given period when the predetermined correlative relationship is detected by the facial-expression estimating means, wherein the facial-expression estimating means continuously detects, while the image-storing controlling means exercises control to perform rapid fire image shooting and storing, for the situation where the facial expression in the face image and the predetermine reference facial expression have a predetermined correlative relationship.

7. An image storage device comprising:

face-image detecting means for detecting a plurality of face images included in time-varying image data;

face-certainty evaluating means for evaluating face certainties of the plurality of face images detected;

facial-expression-correlation estimating means for estimating a facial expression correlation representing a degree of correlation between a predetermined reference facial expression and a facial expression in a face image having a highest face certainty among the face certainties of the plurality of face images;

facial-expression estimating means for detecting, through estimation based on transition of the facial expression correlation, a situation where the predetermined reference facial expression and the facial expression in the face image having the highest face certainty have a predetermined correlative relationship including a (i) gradient of change in the facial expression correlation exceeds a predetermined value or (ii) the facial expression correlation exceeds a predetermined degree, within a predetermined period; and image-storage controlling means for exercising control so that a rapid fire image shooting and storing is performed during a given period when the predetermined correlative relationship is detected by the facial-expression estimating means, wherein the facial-expression estimating means continuously detects, while the image-storing controlling means exercises control to perform rapid fire image shooting and storing, for the situation where the facial expression in the face image and the predetermine reference facial expression have a predetermined correlative relationship.

8. An image storage device comprising:

face-image detecting means for detecting a plurality of face images included in time-varying image data;

selection accepting means for accepting selection of a face image that is to be used for estimation among the plurality of face images detected;

facial-expression-correlation estimating means for estimating a facial expression correlation representing a degree of correlation between a facial expression in the selected face image and a predetermined reference facial expression;

facial-expression estimating means for detecting, through estimation based on transition of the facial expression correlation, a situation where the facial expression in the selected face image and the predetermined reference facial expression have a predetermined correlative relationship including a (i) gradient of change in the facial expression correlation exceeds a predetermined value or (ii) the facial expression correlation exceeds a predetermined degree, within a predetermined period; and image-storage controlling means for exercising control so that a rapid fire image shooting and storing is performed during a given period when the predetermined correlative relationship is detected by the facial-expression estimating means, wherein the facial-expression estimating means continuously detects, while the image-storing controlling means exercises control to perform rapid fire image shooting and storing, for the situation where the facial expression in the face image and the predetermine reference facial expression have a predetermined correlative relationship.

9. An imaging device comprising:

imaging means for imaging a time-varying object and outputting corresponding image data;

facial-expression-correlation estimating means for estimating a facial expression correlation representing a degree of correlation between a facial expression in a face image included in the image data and a predetermined reference facial expression;

facial-expression estimating means for detecting, through estimation based on transition of the facial expression correlation, a situation where the facial expression in the face image and the predetermined reference facial expression have a predetermined correlative relationship including a (i) gradient of change in the facial expression correlation exceeds a predetermined value or (ii) the facial expression correlation exceeds a predetermined degree, within a predetermined period; and image-storage controlling means for exercising control so that a rapid fire image shooting and storing is performed during a given period when the predetermined correlative relationship is detected by the facial-expression estimating means, wherein the facial-expression estimating means continuously detects, while the image-storing controlling means exercises control to perform rapid fire image shooting and storing, for the situation where the facial expression in the face image and the predetermine reference facial expression have a predetermined correlative relationship.

10. An image storage method comprising the steps of:

estimating a facial expression correlation representing a degree of correlation between a facial expression in a face image and a predetermined reference facial expression, the face image being included in time-varying image data;

detecting, through estimation based on transition of the facial expression correlation, a situation where the facial expression in the face image and the predetermined reference facial expression have a predetermined correlative relationship including a (i) gradient of change in the facial expression correlation exceeds a predetermined value or (ii) the facial expression correlation exceeds a predetermined degree, within a predetermined period; and exercising control so that a rapid fire image shooting and storing is performed during a given period when the predetermined correlative relationship is detected by said detecting, wherein the detecting continuously detects, while the exercising exercises control to perform rapid fire image shooting and storing, for the situation where the facial expression in the face image and the predetermine reference facial expression have a predetermined correlative relationship.

11. A non-transitory computer readable medium having a computer program recorded thereon, the program including computer instructions for causing a computer to execute a method comprising the steps of:

estimating a facial expression correlation representing a degree of correlation between a facial expression in a face image and a predetermined reference facial expression, the face image being included in time-varying image data;

detecting, through estimation based on transition of the facial expression correlation, a situation where the facial expression in the face image and the predetermined reference facial expression have a predetermined correlative relationship including a (i) gradient of change in the facial expression correlation exceeds a predetermined value or (ii) the facial expression correlation exceeds a predetermined degree, within a predetermined period; and exercising control so that a rapid fire image shooting and storing is performed during a given period when the predetermined correlative relationship is detected by said detecting, wherein the detecting continuously detects, while the exercising exercises control to perform rapid fire image shooting and storing, for the situation where the facial expression in the face image and the predetermine reference facial expression have a predetermined correlative relationship.

12. An image storage device comprising:

a facial-expression-correlation estimator configured to estimate a facial expression correlation representing a degree of correlation between a facial expression in a face image and a predetermined reference facial expression, the face image being included in time-varying image data;

a facial-expression estimator configured to detect, through estimation based on transition of the facial expression correlation, a situation where the facial expression in the face image and the predetermined reference facial expression have a predetermined correlative relationship including a (i) gradient of change in the facial expression correlation exceeds a predetermined value or (ii) the facial expression correlation exceeds a predetermined degree, within a predetermined period; and an image-storage controller configured to exercise control so that a rapid fire image shooting and storing is performed during a given period when the predetermined correlative relationship is detected by the facial-expression estimator, wherein the facial-expression estimator continuously detects, while the image-storage controller exercises control to perform rapid fire image shooting and storing, for the situation where the facial expression in the face image and the predetermine reference facial expression have a predetermined correlative relationship.

13. An image storage device comprising:

a face-image detector configured to detect a face image included in time-varying image data;

a facial-expression-correlation estimator configured to estimate a facial expression correlation representing a degree of correlation between a facial expression in the detected face image and a predetermined reference facial expression;

a facial-expression estimator configured to detect, through estimation based on transition of the facial expression correlation, a situation where the facial expression in the face image and the predetermined reference facial expression have a predetermined correlative relationship including a (i) gradient of change in the facial expression correlation exceeds a predetermined value or (ii) the facial expression correlation exceeds a predetermined degree, within a predetermined period; and an image-storage controller configured to exercise control so that a rapid fire image shooting and storing is performed during a given period when the predetermined correlative relationship is detected by the facial-expression estimator, wherein the facial-expression estimator continuously detects, while the image-storage controller exercises control to perform rapid fire image shooting and storing, for the situation where the facial expression in the face image and the predetermine reference facial expression have a predetermined correlative relationship.

14. An image storage device comprising:

a face-image detector configured to detect a plurality of face images included in time-varying image data;

a face-certainty evaluator configured to evaluate face certainties of the plurality of face images detected;

a facial-expression-correlation estimator configured to estimate a facial expression correlation representing a degree of correlation between a predetermined reference facial expression and a facial expression in a face image having a highest face certainty among the face certainties of the plurality of face images;

a facial-expression estimator configured to detect, through estimation based on transition of the facial expression correlation, a situation where the predetermined reference facial expression and the facial expression in the face image having the highest face certainty have a predetermined correlative relationship including a (i) gradient of change in the facial expression correlation exceeds a predetermined value or (ii) the facial expression correlation exceeds a predetermined degree, within a predetermined period; and an image-storage controller configured to exercise control so that a rapid fire image shooting and storing is performed during a given period when the predetermined correlative relationship is detected by the facial-expression estimator, wherein the facial-expression estimator continuously detects, while the image-storage controller exercises control to perform rapid fire image shooting and storing, for the situation where the facial expression in the face image and the predetermine reference facial expression have a predetermined correlative relationship.

15. An image storage device comprising:

a face-image detector configured to detect a plurality of face images included in time-varying image data;

a selection accepting unit configured to accept selection of a face image that is to be used for estimation among the plurality of face images detected;

a facial-expression-correlation estimator configured to estimate a facial expression correlation representing a degree of correlation between a facial expression in the selected face image and a predetermined reference facial expression;

a facial-expression estimator configured to detect, through estimation based on transition of the facial expression correlation, a situation where the facial expression in the selected face image and the predetermined reference facial expression have a predetermined correlative relationship including a (i) gradient of change in the facial expression correlation exceeds a predetermined value or (ii) the facial expression correlation exceeds a predetermined degree, within a predetermined period; and an image-storage controller configured to exercise control so that a rapid fire image shooting and storing is performed during a given period when the predetermined correlative relationship is detected by the facial-expression estimator, wherein the facial-expression estimator continuously detects, while the image-storage controller exercises control to perform rapid fire image shooting and storing, for the situation where the facial expression in the face image and the predetermine reference facial expression have a predetermined correlative relationship.

16. An imaging device comprising:

an imaging unit configured to image a time-varying object and to output corresponding image data;

a facial-expression-correlation estimator configured to estimate a facial expression correlation representing a degree of correlation between a facial expression in a face image included in the image data and a predetermined reference facial expression;

a facial-expression estimator configured to detect, through estimation based on transition of the facial expression correlation, a situation where the facial expression in the face image and the predetermined reference facial expression have a predetermined correlative relationship including a (i) gradient of change in the facial expression correlation exceeds a predetermined value or (ii) the facial expression correlation exceeds a predetermined degree, within a predetermined period; and an image-storage controller configured to exercise control so that a rapid fire image shooting and storing is performed during a given period when the predetermined correlative relationship is detected by the facial-expression estimator;

wherein the facial-expression estimator continuously detects, while the image-storage controller exercises control to perform rapid fire image shooting and storing, for the situation where the facial expression in the face image and the predetermine reference facial expression have a predetermined correlative relationship.

17. An image storage device comprising:

a facial-expression-correlation estimating unit to estimate a facial expression correlation representing a degree of correlation between a facial expression in a face image and a predetermined reference facial expression, the face image being included in time-varying image data; and an image storage control unit to exercise control in response to the facial expression correlation so that a rapid fire image shooting and storing is performed during a given period when a predetermined correlative relationship is estimated by the facial-expression-correlation estimating unit to be above a threshold, wherein the facial-expression-correlation estimating unit continuously estimates, while the image storage control unit exercises control to perform rapid fire image shooting and storing, the facial expression correlation representing a degree of correlation between a facial expression in a face image and a predetermined reference facial expression.

18. An image storage method comprising:

estimating a facial expression correlation representing a degree of correlation between a facial expression in a face image and a predetermined reference facial expression, the estimating performed on a processor and the face image being included in time-varying image data; and controlling an image storage in response to the step of estimating so that a rapid fire image shooting and storing is performed during a given period when a predetermined correlative relationship is estimated by the estimating to be above a threshold, wherein the estimating continuously estimates, while rapid fire image shooting and storing is performed, the facial expression correlation representing a degree of correlation between a facial expression in a face image and a predetermined reference facial expression.

* * * * *